US012571936B2

(12) United States Patent
Chen et al.

(10) Patent No.: US 12,571,936 B2
(45) Date of Patent: Mar. 10, 2026

(54) INSPECTION SYSTEM AND INSPECTION METHOD

(71) Applicants: Tsinghua University, Beijing (CN); Nuctech Company Limited, Beijing (CN)

(72) Inventors: Zhiqiang Chen, Beijing (CN); Li Zhang, Beijing (CN); Qingping Huang, Beijing (CN); Yong Zhou, Beijing (CN); Hui Ding, Beijing (CN); Xin Jin, Beijing (CN); Chao Ji, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 237 days.

(21) Appl. No.: 18/574,638

(22) PCT Filed: Jul. 6, 2022

(86) PCT No.: PCT/CN2022/104131
§ 371 (c)(1),
(2) Date: Dec. 27, 2023

(87) PCT Pub. No.: WO2023/280209
PCT Pub. Date: Jan. 12, 2023

(65) Prior Publication Data
US 2024/0377553 A1     Nov. 14, 2024

(30) Foreign Application Priority Data
Jul. 7, 2021     (CN) ........................ 202110768765.X

(51) Int. Cl.
*G01V 5/226*     (2024.01)
*G01B 15/04*     (2006.01)
(Continued)

(52) U.S. Cl.
CPC ............. *G01V 5/226* (2024.01); *G01B 15/04* (2013.01); *G01N 23/046* (2013.01); *G01V 5/232* (2024.01)

(58) Field of Classification Search
CPC ...... G01B 15/04; G01N 23/046; G01V 5/226; G01V 5/232
See application file for complete search history.

(56) References Cited

U.S. PATENT DOCUMENTS

2010/0142672 A1     6/2010   Crowley
2011/0058644 A1     3/2011   Thran et al.
(Continued)

FOREIGN PATENT DOCUMENTS

AU     2019373486     6/2021
CN     200956017 Y     10/2007
(Continued)

OTHER PUBLICATIONS

"Chinese Application No. 202110768765.X, First Office Action dated Mar. 1, 2024", (Mar. 1, 2024), 24 pgs.
(Continued)

*Primary Examiner* — Mark R Gaworecki
(74) *Attorney, Agent, or Firm* — Schwegman Lundberg & Woessner, P.A.

(57)     ABSTRACT

Provided are an inspection method, and an inspection system including: at least one ray source; a detector assembly and a conveying device. At least one ray source and the detector assembly may move in a traveling direction relative to the conveying device, so that the to-be-inspected object may enter an inspection region. When viewed along a central axis of the inspection region, at least one ray source may translate between scanning positions, and a translation distance of at least one ray source between two adjacent scanning positions is greater than a spacing between adja- (Continued)

cent target spots of each ray source. When at least one ray source is located at one scanning position, at least one ray source and the detector assembly move in the traveling direction and at least one ray source emits X-rays. After moving a predetermined distance, at least one ray source translates to another scanning position.

20 Claims, 13 Drawing Sheets

(51) Int. Cl.
*G01N 23/04* (2018.01)
*G01N 23/046* (2018.01)
*G01V 5/20* (2024.01)
*G01V 5/22* (2024.01)

(56) References Cited

U.S. PATENT DOCUMENTS

2012/0076257 A1 3/2012 Star-Lack et al.
2015/0199804 A1 7/2015 Chen et al.
2017/0164910 A1 6/2017 Cao et al.

FOREIGN PATENT DOCUMENTS

| CN | 101382508 A | 3/2009 |
|---|---|---|
| CN | 201203586 Y | 3/2009 |
| CN | 102359971 A | 2/2012 |
| CN | 102422178 A | 4/2012 |
| CN | 103852797 A | 6/2014 |
| CN | 105589093 A | 5/2016 |
| CN | 108614301 A | 10/2018 |
| CN | 108811488 A | 11/2018 |
| EP | 3236246 | 10/2017 |
| JP | 2000235007 A | 8/2000 |
| WO | WO-9804193 A1 | 2/1998 |
| WO | 2020087825 | 5/2020 |

OTHER PUBLICATIONS

"European Application No. 22836955.9, Extended Search Report dated Jun. 11, 2025", (Jun. 11, 2025), 8 pgs.
"International Application Serial No. PCT/CN2022/104131, International Search Report dated Oct. 9, 2022", w/ English Translation, (Oct. 9, 2022), 6 pgs.
"International Application Serial No. PCT/CN2022/104131, Written Opinion dated Oct. 9, 2022", (Oct. 9, 2022), 4 pgs.

100

120

300

200

220    210

230

100 —

100 —

INSPECTION SYSTEM AND INSPECTION METHOD

PRIORITY APPLICATIONS

This application is a U.S. National Stage Filing under 35 U.S.C. § 371 from International Application No. PCT/CN2022/104131, filed on Jul. 6, 2022, and published as WO2023/280209 on Jan. 12, 2023, which claims the benefit of priority to Chinese Application No. 202110768765.X, filed on Jul. 7, 2021; the benefit of priority of each of which is hereby claimed herein, and which applications and publication are hereby incorporated herein by reference in their entireties.

TECHNICAL FIELD

The present disclosure relates to the field of security inspection technology, in particular, to an inspection system and an inspection method for security inspection, and more specifically, to an inspection system and an inspection method for a security inspection of an aviation pallet cargo.

BACKGROUND

The safety of the aviation pallet cargo or the aviation container is directly related to the safety of the aviation vehicle (such as aircraft). It is needed to perform a security inspection on the aviation pallet cargo before loading the aviation pallet cargo onto the aircraft. The aviation pallet cargo may have a large size, usually with a length of 1.2 m, a width of 1.2 m and a height of 1.65 m, or even larger. Different types of cargoes may be stacked together inside the aviation pallet cargo.

Various existing inspection methods for aviation pallet cargoes have respective problems. Therefore, there is a need to provide an improved inspection system and inspection method, especially an inspection system and an inspection method for the aviation pallet cargo.

The above information disclosed in this section is just for understanding of the background of the inventive concept of the present disclosure. Therefore, the above information may contain information that does not constitute the related art.

SUMMARY

In an aspect of embodiments of the present disclosure, an inspection system is provided, including: at least one ray source configured to emit X-rays, each ray source includes a separate housing configured to define a vacuum space and includes a plurality of target spots enclosed within the housing: a detector assembly configured to receive X-rays emitted from the at least one ray source and passing through an inspection region of the inspection system; and a conveying device configured to carry an object to be inspected, the at least one ray source and the detector assembly are movable in a traveling direction relative to the conveying device, so that the object to be inspected enters the inspection region and the at least one ray source is translatable among a plurality of scanning positions when viewed along a central axis of the inspection region, a translation distance of at least one ray source between two adjacent scanning positions is greater than a spacing between adjacent target spots of each ray source, and the traveling direction is parallel to the central axis; and the inspection system is configured such that: the at least one ray source and the detector assembly move in the traveling direction relative to the conveying device and the at least one ray source emits X-rays, when the at least one ray source is located at one of the plurality of scanning positions; and the at least one ray source translates to another one of the plurality of scanning positions, after the at least one ray source and the detector assembly move a predetermined distance in the traveling direction relative to the conveying device.

According to some embodiments of the present disclosure, the conveying device is configured to transport the object to be inspected in the traveling direction.

According to some embodiments of the present disclosure, the at least one ray source is configured to translate between different scanning positions, so that a combined scanning angle of the at least one ray source is greater than 180 degrees.

According to some embodiments of the present disclosure, the inspection system is configured such that: the at least one ray source and the detector assembly do not move in the traveling direction relative to the conveying device when the at least one ray source translates between different scanning positions.

According to some embodiments of the present disclosure, the translation distance of each ray source between two adjacent scanning positions is less than a length of the ray source in the translation direction.

According to some embodiments of the present disclosure, the detector assembly is arranged radially closer to the central axis than the at least one ray source. According to some embodiments of the present disclosure, target spots of the at least one ray source are located in a first plane.

According to some embodiments of the present disclosure, detector crystals of the detector assembly are located in a second plane.

According to some embodiments of the present disclosure, the first plane is parallel to the second plane, and a target spot of each ray source is configured to deflect a predetermined tilt angle toward the detector assembly along the central axis, so that the X-rays emitted by each ray source are not blocked by the detector assembly before passing through the inspection region.

According to some embodiments of the present disclosure, the detector assembly includes a plurality of detector arms, each detector arm is provided with a plurality of detector units, and each detector arm is configured to receive X-rays emitted by at least two ray sources.

According to some embodiments of the present disclosure, each detector unit includes a detector crystal, and each detector crystal is arranged at an end of a corresponding detector unit close to the at least one ray source along the central axis.

According to some embodiments of the present disclosure, the plurality of detector arms are configured to extend completely around the central axis to form a detector ring.

According to some embodiments of the present disclosure, the at least one ray source includes a plurality of ray sources, and the plurality of ray sources are configured to translate between different scanning positions synchronously.

According to some embodiments of the present disclosure, the plurality of ray sources are spaced around the inspection region.

According to some embodiments of the present disclosure, the detector assembly is configured to be translatable when viewed along the central axis of the inspection region.

According to some embodiments of the present disclosure, the at least one ray source and the detector assembly are configured to synchronously translate when viewed along the central axis of the inspection region.

According to some embodiments of the present disclosure, each ray source is further configured to move between at least two target spot positions, a rotation angle of each ray source between two adjacent target spot positions is less than an angle of two adjacent target spots of the ray source relative to the central axis, or a movement distance of each ray source between adjacent target spot positions is less than a spacing between two adjacent target spots of the ray source.

According to some embodiments of the present disclosure, a rotation angle of each ray source between two farthest target spot positions is less than the angle of two adjacent target spots of the ray source relative to the central axis, or a movement distance of each ray source between two farthest target spot positions is less than the spacing between two adjacent target spots of the ray source.

According to some embodiments of the present disclosure, the at least one ray source is configured to be always located above the conveying device during a translation process.

According to some embodiments of the present disclosure, the inspection system is further configured to reconstruct a three-dimensional scanning image of the object to be inspected based on detection data of the detector assembly.

According to some embodiments of the present disclosure, the central axis is parallel to a horizontal direction.

According to some embodiments of the present disclosure, a ray emission direction of the at least one ray source is not perpendicular to the central axis.

According to some embodiments of the present disclosure, the inspection system is configured such that the at least one ray source does not emit X-rays when the at least one ray source translates between different scanning positions.

According to some embodiments of the present disclosure, the at least one ray source and the detector assembly move a predetermined distance in the traveling direction relative to the conveying device, so that the object to be inspected completely passes through the inspection region or the object to be inspected does not completely pass through the inspection region.

According to some embodiments of the present disclosure, the translation distance of the at least one ray source between two adjacent scanning positions is greater than a spacing between any two target spots of each ray source.

In another aspect of the present disclosure, an inspection method is provided, including: (a) carrying an object to be inspected on a conveying device: (b) positioning, when viewed along a central axis of an inspection region, at least one ray source is located at one of a plurality of scanning positions surrounding the inspection region, each ray source includes a separate housing configured to define a vacuum space and includes a plurality of target spots enclosed within the housing: (c) moving the at least one ray source and the detector assembly in a traveling direction relative to the conveying device, so that the object to be inspected enters the inspection region, while emitting X-rays from the at least one ray source so that the X-rays pass through the object to be inspected located in the inspection region and are received by the detector assembly, and a scanning process is completed until the at least one ray source and the detector assembly move a predetermined distance in the traveling direction relative to the conveying device; and (d) translating the at least one ray source to another one of the plurality of scanning positions, and repeating step (c) to complete the scanning process at each of the plurality of scanning positions, a translation distance of the at least one ray source between two adjacent scanning positions is greater than a spacing between adjacent target spots of each ray source, and the traveling direction is parallel to the central axis.

According to some embodiments of the present disclosure, the object to be inspected is transported in the traveling direction by the conveying device.

According to some embodiments of the present disclosure, steps (c) and (d) are repeated, so that a combined scanning angle of the at least one ray source is greater than 180 degrees.

According to some embodiments of the present disclosure, the at least one ray source and detector assembly are configured to stop moving in the traveling direction relative to the conveying device after each time the object to be inspected completely passes through the inspection region, and in two adjacent repetitions of step (c), the ray source and the detector assembly are configured to move in opposite directions relative to the conveying device.

According to some embodiments of the present disclosure, the translation distance of each ray source between two adjacent scanning positions is less than a length of the ray source in the translation direction.

According to some embodiments of the present disclosure, the inspection method further includes: after completing a scanning process at one of the plurality of scanning positions in step (c), moving the at least one ray source to one of a plurality of target spot positions and repeating step (c), the plurality of target spot positions include a current scanning position, a rotation angle of each ray source between two adjacent target spot positions is less than an angle of two adjacent target spots of the ray source relative to the central axis, or a movement distance of each ray source between two adjacent target spot positions is less than a spacing between two adjacent target spots of the ray source.

According to some embodiments of the present disclosure, a rotation angle of each ray source between two farthest target spot positions is less than the angle of two adjacent target spots of the ray source relative to the central axis, or a movement distance of each ray source between two farthest target spot positions is less than the spacing between two adjacent target spots of the ray source.

According to some embodiments of the present disclosure, the at least one ray source is configured to be always located above the conveying device during a translation process of the at least one ray source.

According to some embodiments of the present disclosure, the inspection method further includes: reconstructing a three-dimensional scanning image of the object to be inspected based on detection data of the detector assembly.

According to some embodiments of the present disclosure, the central axis is parallel to a horizontal direction.

According to some embodiments of the present disclosure, a ray emission direction of the at least one ray source is not perpendicular to the central axis.

According to some embodiments of the present disclosure, the at least one ray source does not emit X-rays when the at least one ray source translates between different scanning positions.

According to some embodiments of the present disclosure, the at least one ray source and the detector assembly move a predetermined distance in the traveling direction relative to the conveying device, so that the object to be inspected completely passes through the inspection region or the object to be inspected does not completely pass through the inspection region.

According to some embodiments of the present disclosure, the translation distance of the at least one ray source between two adjacent scanning positions is greater than a spacing between any two target spots of each ray source.

Figure 1:
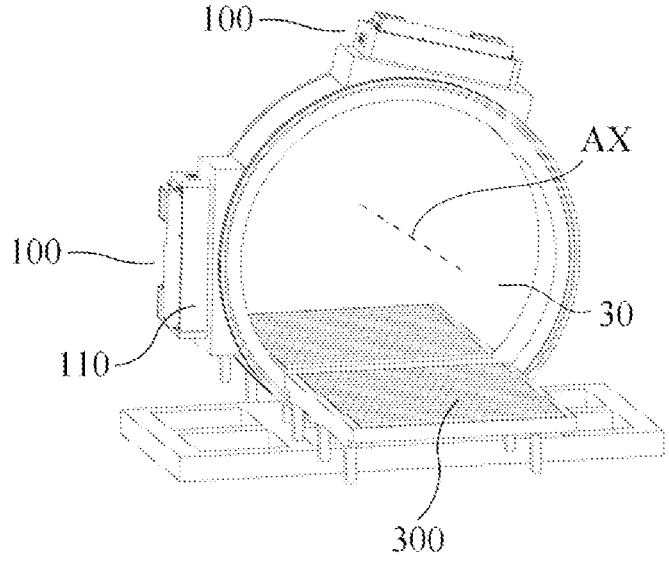
FIG. 1 shows a schematic diagram of an inspection system according to some embodiments of the present disclosure.

It should be noted that for the sake of clarity, in the drawings used to describe embodiments of the present disclosure, sizes of layers, structures or regions may be enlarged or reduced, that is, those drawings are not drawn according to actual scale.

DETAILED DESCRIPTION OF EMBODIMENTS

Hereinafter, embodiments of the present disclosure will be described with reference to accompanying drawings. The following detailed description and accompanying drawings are intended to illustrate principles of the present disclosure. The present disclosure is not limited to the described preferred embodiments, and the scope of the present disclosure is defined by the appended claims. The present disclosure will now be described in detail with reference to exemplary embodiments, some of which are illustrated in the accompanying drawings. The following description is given with reference to the accompanying drawings. Unless otherwise specified, the same reference numerals in different drawings indicate the same or similar elements. The solutions described in the following exemplary embodiments do not represent all solutions of the present disclosure. Rather, those solutions are just examples of systems and methods of various aspects of the present disclosure that are addressed in the appended claims.

In the related art, an aviation pallet cargo may be inspected by using a variety of methods, for example, including: generating a perspective image using a single-view or dual-view X-ray inspection system: splicing a three-dimensional scanning image using a multi-view X-ray inspection system: dismantling the aviation pallet cargo to inspect objects one by one and then reloading the objects into the aviation pallet cargo; and generating a three-dimensional CT image using a CT scanning system.

In the first method described above, the single-view or dual-view X-ray inspection system may scan the aviation pallet cargo passing through a scanning region of the inspection system and generate a single-view or dual-view perspective image. However, as the aviation pallet cargo has a large size and the objects inside are stacked together, there may be a serious overlap in the perspective image generated by an existing single-view or dual-view X-ray inspection system, which makes it difficult to accurately detect prohibited items such as explosives, flammable liquids, knives and guns, etc. from the perspective image.

In the second method described above, the multi-view X-ray inspection system may scan the aviation pallet cargo passing through the scanning region of the inspection system and generate multi-view perspective images or splice the multi-view perspective images into a three-dimensional scanning image. By generating scanning images from multiple views and splicing the three-dimensional scanning image, it is possible to partially reduce an impact of an image overlap and improve an automatic recognition capability. However, such method may result in a low pass rate of objects to be inspected and a scanning angle is still limited. In addition, the spliced three-dimensional image has a poor quality, and the automatic recognition capability for prohibited items such as explosives is limited.

In the third method described above, the loaded aviation pallet cargo is dismantled manually for the security inspection of objects one by one, and then the objects are reloaded into an aviation pallet cargo. Such method has low efficiency and high labor costs.

In the fourth method described above, the three-dimensional scanning image may be generated by CT scanning which has a high recognition capability. Computed tomography (CT) is widely used in fields such as object detection and medical diagnosis, and the three-dimensional scanning image may be generated by CT scanning. According to a movement of a ray source relative to an object to be inspected during a scanning process, the existing CT scanning system may include a dynamic spiral CT scanning system and a static CT scanning system.

In the dynamic spiral CT scanning system, while the ray source continuously rotates around the object to be inspected during the scanning process, a conveying device may transport the object to be inspected horizontally through a scanning region at a constant speed. The dynamic spiral CT scanning system generally requires a slip ring and a bearing, and the slip ring needs to rotate at a high speed during the scanning process. If the object to be inspected has a large size, the slip ring and the bearing of the dynamic spiral CT scanning system need to have large diameters, which poses very high requirements to a machining accuracy of components as well as rigidity and stability of a support structure in the dynamic spiral CT scanning system. In addition, in the dynamic spiral CT scanning system using the slip ring, as a ray source and a detector are installed on a turntable with a large diameter and rotate synchronously, the conveying device for the dynamic spiral CT scanning system needs to be provided at a high position, which increases a difficulty of loading and/or unloading a large-sized object onto and/or off the conveying device.

In the static CT scanning system, the ray source is fixed during the entire scanning process, and an integrated ray source surrounding the inspection region is used for scanning. However, when the object to be inspected has a large size, it is difficult to design a large-sized integrated ray source, and a manufacturing cost is very high. Moreover, the integrated ray source needs to be replaced as a whole when a failure occurs (for example, several target spots are damaged), and thus has a poor maintainability.

The inspection system and the inspection method according to embodiments of the present disclosure may be applicable to a perspective imaging inspection of an object, especially an aviation pallet cargo or aviation container, etc.

Figure 2:
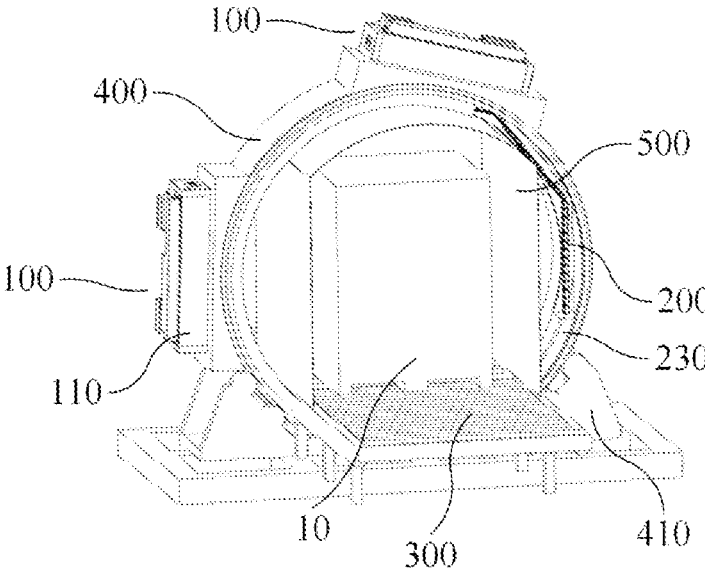
FIG. 2 shows a schematic diagram of an inspection system in an operating state according to some embodiments of the present disclosure.

FIG. 1 shows a schematic diagram of an inspection system according to some embodiments of the present disclosure. FIG. 2 shows a schematic diagram of an inspection system in operating state according to some embodiments of the present disclosure.

In an exemplary embodiment, as shown in FIG. 1 and FIG. 2, the inspection system includes a plurality of ray sources 100, a detector assembly 200 (not shown in FIG. 1), and a conveying device 300. The inspection system defines an inspection region 30. The ray sources 100 are used to emit X-rays. The detector assembly 200 is used to receive X-rays emitted from the ray sources 100 and passing through the inspection region. The conveying device 300 is used to carry an object to be inspected 10. According to some embodiments of the present disclosure, the plurality of ray sources 100 and the detector assembly 200 are movable in a traveling direction relative to the conveying device 300. In an exemplary embodiment, the conveying device 300 is used to transport the object to be inspected in the traveling direction into the inspection region. In an exemplary embodiment, the traveling direction is parallel to a horizontal direction. According to some embodiments of the present disclosure, the conveying device 300 may reciprocally transport the object to be inspected through the inspection region in the traveling direction, that is, transport the object to be inspected back and forth in opposite directions. In some embodiments, the conveying device 300 transports the object to be inspected in a uniform linear motion.

In the present disclosure, "axial direction" refers to a direction parallel to the traveling direction, and "radial direction" refers to a direction radiating outward from a rotation axis or from a central axis of the inspection region (to be described in detail below) within a plane perpendicular to the traveling direction, and "circumferential direction" refers to a direction that is within the plane perpendicular to the traveling direction and that is perpendicular to the "radial direction".

The above-mentioned inspection system includes a plurality of ray sources 100. However, embodiments of the present disclosure are not limited thereto. According to some embodiments of the present disclosure, the inspection system may include one or more ray sources 100.

According to some embodiments of the present disclosure, each ray source 100 is a distributed ray source. In an exemplary embodiment, each ray source 100 has a separate housing 110 to define a separate vacuum space. Each ray source 100 includes a plurality of target spots (not shown in FIG. 1 and FIG. 2) enclosed within the housing 110. In an exemplary embodiment, the plurality of target spots of each ray source 100 have a uniform spacing between target spots.

As described above, when the inspection system includes a plurality of ray sources 100, each ray source 100 defines a separate vacuum space and therefore does not share the vacuum space with other ray sources 100. The vacuum spaces of different ray sources 100 are not connected. According to some embodiments of the present disclosure, each ray source 100 may be disassembled from and/or installed in the inspection system independently from other ray sources 100.

In the present disclosure, the "inspection region" refers to a region where the object to be inspected undergoes perspective imaging. When the object to be inspected is located in the inspection region 30, X-rays emitted from the ray source 100 may penetrate the object to be inspected and be received by the detector assembly 200. In an exemplary embodiment, the inspection region includes a first end and a second end. In some embodiments, the conveying device 300 may transport the object to be inspected into the inspection region from one of the first end and the second end, and out of the inspection region from the other of the first end and the second end.

According to some embodiments of the present disclosure, the inspection region may have a cross-section, such as a rectangular cross-section, in a plane perpendicular to the traveling direction. In an exemplary embodiment, the object to be inspected is an aviation pallet cargo, or known as an air container. In some embodiments, the cross-section of the inspection region may have a length and/or width of 1.5 meters to 1.8 meters to be adapted to an inspection of the aviation pallet cargo. For example, the rectangular cross-section of the inspection region may have a size of 1.5 m*1.5 m, 1.5 m*1.8 m, or 1.8 m*1.5 m.

As described above, the object to be inspected is an aviation pallet cargo. However, embodiments of the present disclosure are not limited thereto. According to some embodiments of the present disclosure, the inspection system may also be used to inspect other types of objects, especially an object with a large size.

According to some embodiments of the present disclosure, when the inspection system includes a plurality of ray sources 100, the plurality of ray sources 100 are spaced around the inspection region. In some embodiments, when viewed in the traveling direction, the plurality of ray sources 100 may include a ray source 100 above the inspection region, a ray source 100 on a left side of the inspection region, and/or a ray source 100 on a right side of the inspection region.

According to some embodiments of the present disclosure, the one or more ray sources 100 of the inspection system may move one or more times relative to the inspection region, that is, move between two or more scanning positions. Each ray source 100 may have a plurality of scanning positions, and the plurality of scanning positions are distributed around the inspection region. In an exemplary embodiment, a movement trajectory of the ray source 100 along the plurality of scanning positions is coplanar. In some embodiments, the movement trajectory of the ray source 100 along the plurality of scanning positions is perpendicular to the traveling direction.

In the present disclosure, the "scanning position" refers to a position where a ray source 100 may stay and emit X-rays. In some embodiments, the ray source 100 is allowed to emit X-rays only when the ray source 100 stays at a scanning position (remains stationary).

Therefore, the ray source 100 of the inspection system may have a plurality of scanning positions and may move between different scanning positions, so that different ray emission ranges may be provided and perspective imaging data at different angles may be obtained. For example, when the ray source 100 is at a scanning position, the ray source 100 and the detector assembly 200 may move in the traveling direction relative to the conveying device 300, so that the object to be inspected passes through the inspection region (for example, from the first end to the second end of the inspection region). While, X-rays emitted by the ray source 100 penetrate the object to be inspected and are received by the detector assembly 200, so that the inspection system may obtain the perspective imaging data at the scanning position, that is, a scanning process is performed.

According to some embodiments of the present disclosure, the inspection system may be configured such that the one or more ray sources 100 and the detector assembly 200 move in the traveling direction relative to the conveying device 300 carrying the object to be inspected and the one or more ray sources 100 emit X-rays when the one or more ray sources 100 are located at one of the plurality of scanning positions; and the one or more ray sources 100 rotate around the rotation axis to another one of the plurality of scanning positions after the one or more ray sources 100 and the detector assembly 200 move a predetermined distance in the traveling direction relative to the conveying device 300 carrying the object to be inspected so that the object to be inspected completely passes through the inspection region. Therefore, a dynamic-static combined scanning method is used in the inspection system. When X-ray scanning is required, the one or more ray sources 100 stay at a scanning position and emit X-rays, while the one or more ray sources 100 and the detector assembly 200 move in the traveling direction relative to the conveying device 300 so that the object to be inspected enters the inspection region. When it is needed to change an X-ray emission range, the one or more ray sources 100 move from a current scanning position to another scanning position.

As described above, the ray source 100 and the detector assembly 200 move a predetermined distance in the traveling direction relative to the conveying device 300 so that the object to be inspected completely passes through the inspection region. However, embodiments of the present disclosure are not limited thereto. According to some embodiments of the present disclosure, the ray source 100 and the detector assembly 200 may move a predetermined distance in the traveling direction relative to the conveying device 300 so that the object to be inspected does not completely pass through the inspection region, that is, only a part of the object to be inspected is scanned. In some cases, only a partial region in the object to be inspected (e.g., aviation pallet cargo) contains objects that need to be scanned. After that partial region is scanned at a scanning position, the ray source may move to a next scanning position. In this way, the distance that the ray source 100 and the detector assembly 200 move in the traveling direction relative to the conveying device 300 may be reduced, a single scanning time length may be saved, and an overall scanning efficiency may be improved.

In some embodiments, the predetermined distance may be adaptively determined according to the detection data of the detector assembly.

In some embodiments, when the ray source 100 moves between different scanning positions, the ray source 100 and the detector assembly 200 do not move in the traveling direction relative to the conveying device 300. In this case, after a scanning process is completed, the object to be inspected waits for the ray source 100 to move to the next scanning position, and then the ray source 100 and the detector assembly 200 move in the traveling direction relative to the conveying device 300 so that the object to be inspected passes through the inspection region again for a next scanning process. In some embodiments, after each time the ray source 100 and the detector assembly 200 move the predetermined distance in the traveling direction relative to the conveying device 300 so that the object to be inspected completely passes through the inspection region and a scanning process is completed, the ray source 100 and the detector assembly 200 stops moving in the traveling direction relative to the conveying device 300. In this case, in two adjacent passing of the object to be inspected through the inspection region, the ray source 100 and the detector assembly 200 may move in opposite directions relative to the conveying device 300. Thus, the object to be inspected may be scanned each time it passes through the inspection region, so that the inspection efficiency and the object passing rate may be improved. However, embodiments of the present disclosure are not limited thereto. In some embodiments, in each scanning process performed by the inspection system, the ray source 100 and the detector assembly 200 may move in a same direction relative to the conveying device 300 so that the object to be inspected passes through the inspection region. In this case, the ray source 100 and the detector assembly 200 need to return to their respective initial positions relative to the conveying device 300 before each scanning process.

According to some embodiments of the present disclosure, the ray source 100 and the detector assembly 200 are configured to be movable in the traveling direction relative to the conveying device 300. Here, "movable . . . relative to . . . " means that in the traveling direction, the ray source 100 and the detector assembly 200 may move relative to the conveying device 300. For example, "movable . . . relative to . . . " may include at least the following cases: the ray source 100 and the detector assembly 200 move in the traveling direction while the conveying device 300 does not move in the traveling direction: the ray source 100 and the detector assembly 200 do not move in the traveling direction while the conveying device 300 moves in the traveling direction: the ray source 100 and the detector assembly 200 move in the traveling direction and the conveying device 300 also moves in the traveling direction.

According to some embodiments of the present disclosure, the inspection system may be configured such that the one or more ray sources 100 do not emit X-rays when the one or more ray sources 100 move between different scanning positions. In an exemplary embodiment, the inspection system may be configured such that when the one or more ray sources 100 move between different scanning positions, the one or more ray sources 100 do not emit X-rays, and the ray source 100 and the detector assembly 200 do not move in the traveling direction relative to the conveying device 300.

However, embodiments of the present disclosure are not limited thereto. In some embodiments, when the one or more ray sources 100 move between different scanning positions, the one or more ray sources 100 may emit X-rays, and the ray source 100 and the detector assembly 200 may move in the traveling direction relative to the conveying device 300. In this case, in some embodiments, a rotation speed of the ray source 100 around the rotation axis is less than an equivalent exposure speed of the ray source 100. The equivalent exposure speed refers to an angle range of all the target spots of the ray source 100 relative to the rotation axis divided by a time length required for all the target spots in the ray source 100 to complete one round of exposure emission.

According to some embodiments of the present disclosure, a movement of the ray source 100 between different scanning positions relative to the inspection region may include a rotation and a translation, which will be described in detail below.

In an exemplary embodiment, the one or more ray sources 100 of the inspection system may be rotatable between at least two scanning positions around a rotation axis AX. In some embodiments, the rotation axis is parallel to the traveling direction. According to some embodiments of the present disclosure, when the inspection system includes a plurality of ray sources 100, the plurality of ray sources 100 may rotate between different scanning positions synchronously.

According to some embodiments of the present disclosure, each ray source 100 has a scanning angle. Herein, the "scanning angle" of each ray source 100 refers to an angle range of all target spots of the ray source 100 relative to the rotation axis. When a ray source 100 rotates from one scanning position to another scanning position, the scanning angle of the ray source 100 may rotate accordingly. According to some embodiments of the present disclosure, the rotation of each ray source 100 between different scanning positions may provide a combined scanning angle relative to the rotation axis. In some embodiments, when the inspection system includes a plurality of ray sources 100, the rotation of the plurality of ray sources 100 between different scanning positions may also provide a combined scanning angle relative to the rotation axis. Herein, the "combined scanning angle" refers to a scanning angle formed by a combination of the scanning angles of the one or more ray sources 100 at a plurality of scanning positions. In some embodiments, the combined scanning angle formed by the rotation of the one or more ray sources 100 between different scanning positions may be continuous or discontinuous.

According to some embodiments of the present disclosure, through the rotation of the one or more ray sources 100 between different scanning positions, the inspection system may splice out a larger combined scanning angle and ray emission range. Therefore, the rotation of the ray source 100 may generate a larger scanning angle than a fixed ray source.

According to some embodiments of the present disclosure, the inspection system may also reconstruct a three-dimensional scanning image of the object to be inspected based on the detection data of the detector assembly 200. In an exemplary embodiment, the rotation of the one or more ray sources 100 of the inspection system between different scanning positions may generate a combined scanning angle greater than 180 degrees relative to the rotation axis. When the inspection system has a combined scanning angle greater than 180 degrees, the inspection system may generate more complete scanning data, and produce better CT scanning effect and better three-dimensional scanning image.

Figure 3A:
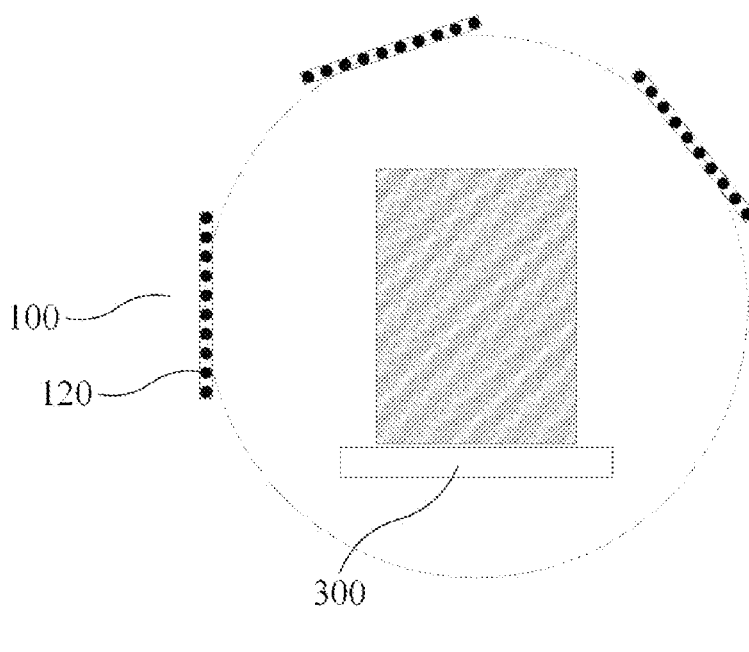
FIG. 3A shows a schematic diagram of an arrangement of a plurality of ray sources according to some embodiments of the present disclosure, in which three ray sources are located at a first scanning position.
Figure 3B:
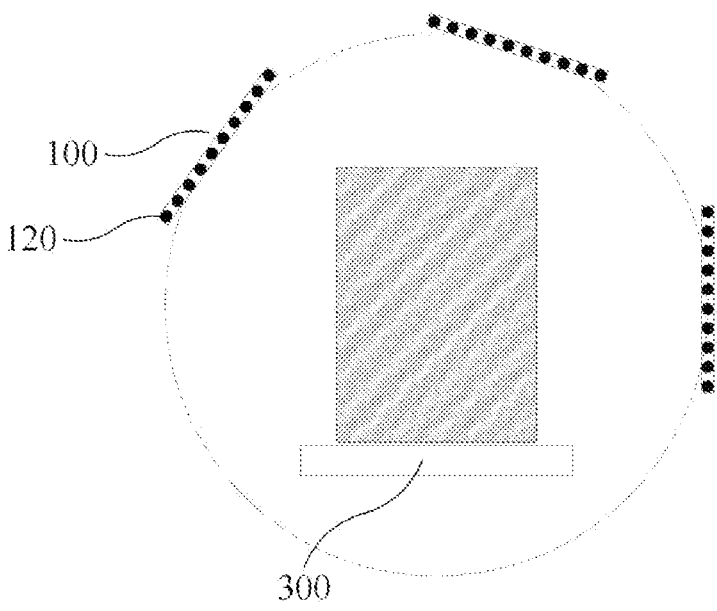
FIG. 3B shows a schematic diagram of an arrangement of a plurality of ray sources according to some embodiments of the present disclosure, in which three ray sources are located at a second scanning position.
Figure 3C:
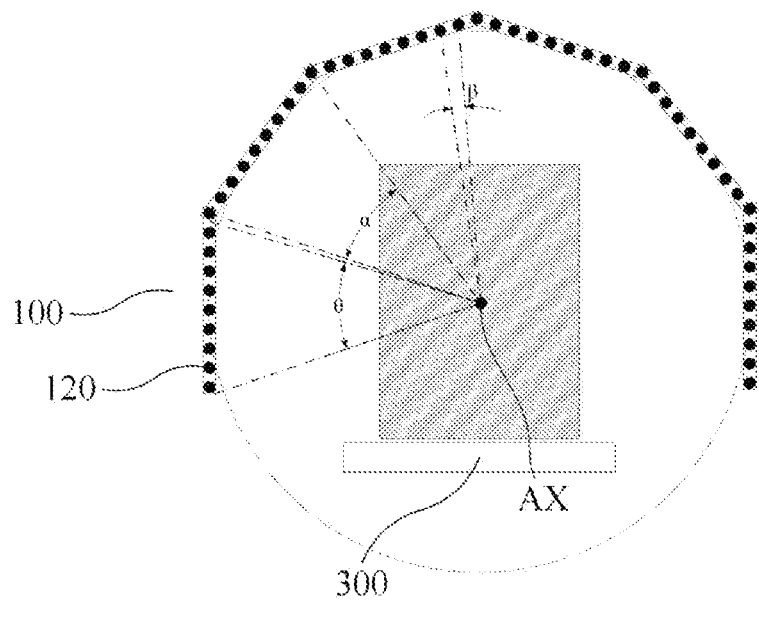
FIG. 3C shows a schematic diagram of an arrangement of a plurality of ray sources according to some embodiments of the present disclosure, in which a superposition state of three ray sources at first and second scanning positions is shown.

According to some embodiments of the present disclosure, as shown in FIG. 3C, a rotation angle θ of each ray source 100 between two adjacent scanning positions is greater than an angle β of adjacent target spots of the ray source 100 relative to the rotation axis. Therefore, the rotation of the ray source 100 between different scanning positions may generate a combined scanning angle to achieve a wider range of scanning. In some embodiments, the rotation angle of each ray source 100 between two adjacent scanning positions is greater than an angle of any two target spots of the ray source relative to the rotation axis. In some embodiments, the rotation angle of each ray source 100 between two adjacent scanning positions is substantially equal to an angle of two farthest target spots of the ray source relative to the rotation axis.

A structure of the one or more rotatable ray sources according to some embodiments of the present disclosure will be described in detail below with reference to the accompanying drawings.

According to some embodiments of the present disclosure, as shown in FIG. 3A to FIG. 5, each ray source 100 includes a plurality of target spots 120 spaced apart. It should be noted that other structures of the ray source 100 are not shown in FIG. 3A to FIG. 5. In an exemplary embodiment, the plurality of target spots 120 of each ray source 100 have a uniform spacing between target spots. In some embodiments, the plurality of target spots 120 of each ray source 100 are distributed along a straight line.

An inspection system including three ray sources 100 is illustrated by way of example in describing the following exemplary embodiment. According to some embodiments of the present disclosure, the inspection system may include three ray sources 100. In an exemplary embodiment, the three ray sources 100 are spaced apart from each other. The three ray sources 100 may be spaced around the inspection region. In some embodiments, each ray source 100 may have two scanning positions.

FIG. 3A shows a schematic diagram of an arrangement of a plurality of ray sources according to some embodiments of the present disclosure, in which three ray sources are located at a first scanning position. FIG. 3B shows a schematic diagram of an arrangement of a plurality of ray sources according to some embodiments of the present disclosure, in which three ray sources are located at a second scanning position. FIG. 3C shows a schematic diagram of an arrangement of a plurality of ray sources according to some embodiments of the present disclosure, in which a superposition state of three ray sources at first and the second scanning positions is shown.

As shown in FIG. 3A, the three ray sources 100 at the first scanning position may cover a scanning angle. When the three ray sources 100 are located at the first scanning position, target spots 120 of the three ray sources 100 may sequentially emit X-rays in a predetermined order, while the conveying device 300 may transport the object to be inspected (shown as the shaded portion) through the inspection region (for example, from the first end to the second end of the inspection region). Then, the inspection system may complete a scanning process at the first scanning position.

After the scanning process at the first scanning position is completed, the three ray sources 100 may rotate around the rotation axis (for example, in a clockwise direction) to the second scanning position. As shown in FIG. 3B, the three ray sources 100 at the second scanning position may cover another scanning angle. When the three ray sources 100 are located at the second scanning position, the target spots 120 of the three ray sources 100 may sequentially emit X-rays in the predetermined order, while the conveying device 300 may transport the object to be inspected through the inspection region again (for example, from the second end to the first end of the inspection region). Then, the inspection system may complete a scanning process at the second scanning position.

Through two scanning processes of the three ray sources 100 at the first scanning position and the second scanning position, as shown in FIG. 3C, the inspection system may combine the scanning angle at the first scanning position and the scanning angle at the second scanning position to generate a combined scanning angle. Therefore, the combined scanning angle generated by the inspection system through the rotation of the three ray sources 100 between the two scanning positions is equivalent to a scanning angle generated simultaneously by six ray sources 100.

An inspection system including two ray sources 100 is illustrated by way of example in describing the following exemplary embodiment. According to some embodiments of the present disclosure, the inspection system may include two ray sources 100. In an exemplary embodiment, the two ray sources 100 are spaced apart from each other. The two ray sources 100 may be spaced around the inspection region. In some embodiments, each ray source 100 may have three scanning positions.

Figure 4A:
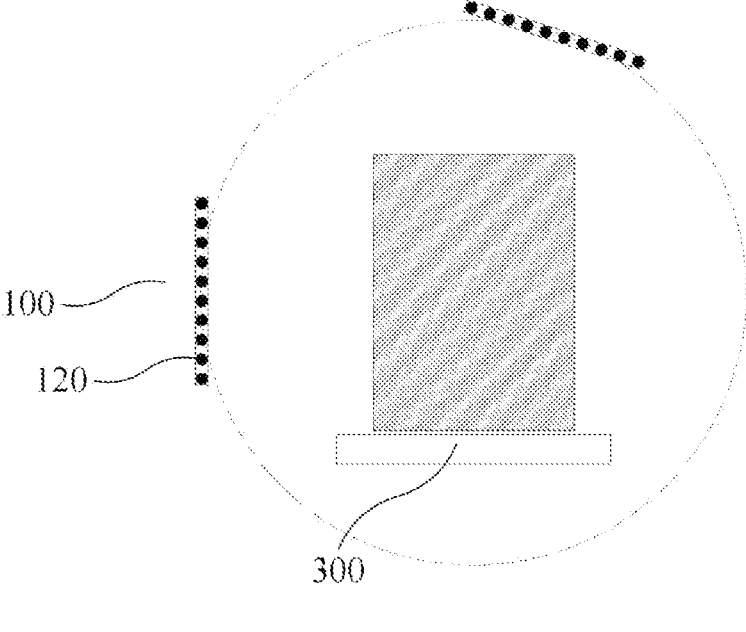
FIG. 4A shows a schematic diagram of an arrangement of a plurality of ray sources according to some embodiments of the present disclosure, in which two ray sources are located at a first scanning position.
Figure 4B:
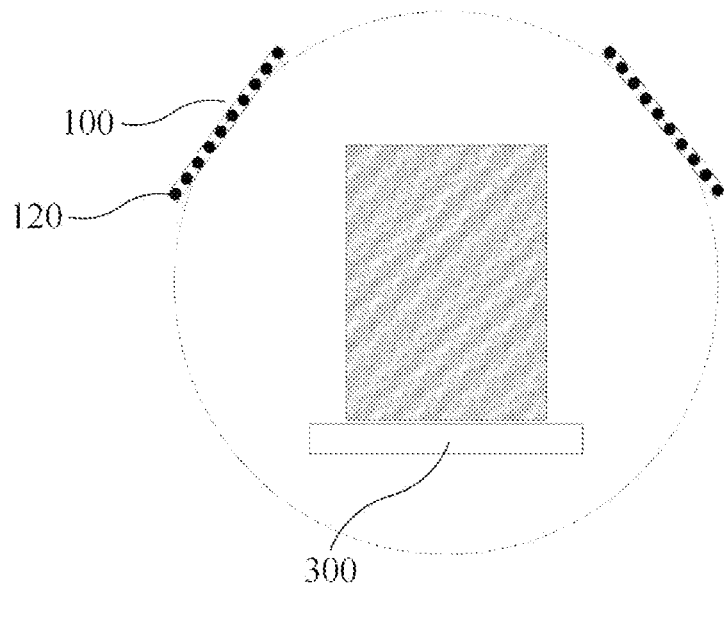
FIG. 4B shows a schematic diagram of an arrangement of a plurality of ray sources according to some embodiments of the present disclosure, in which two ray sources are located at a second scanning position.
Figure 4C:
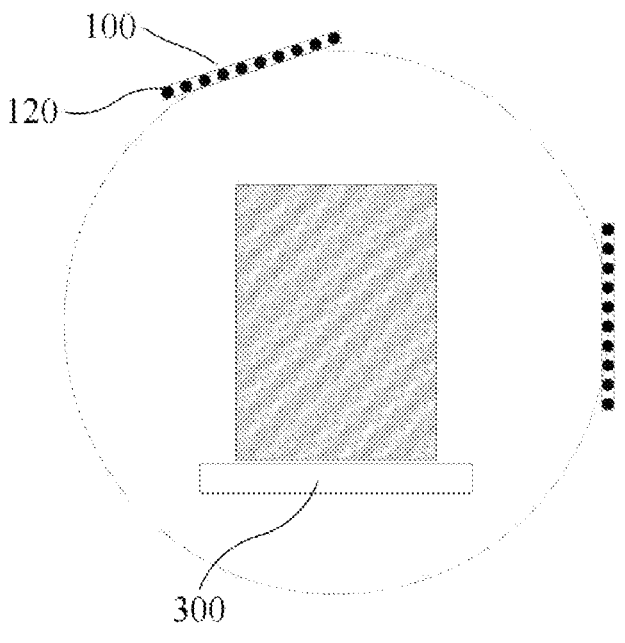
FIG. 4C shows a schematic diagram of an arrangement of a plurality of ray sources according to some embodiments of the present disclosure, in which two ray sources are located at a third scanning position.
Figure 4D:
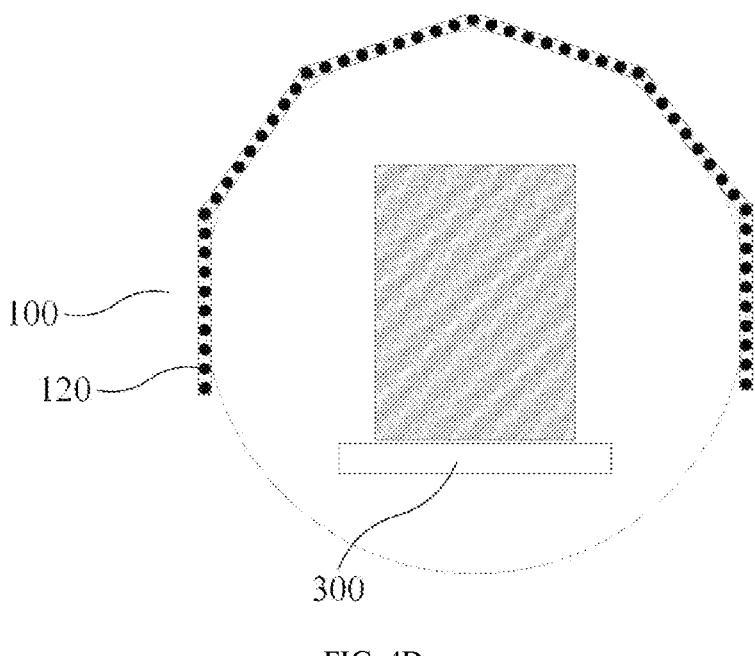
FIG. 4D shows a schematic diagram of an arrangement of a plurality of ray sources according to some embodiments of the present disclosure, in which a superposition state of two ray sources at first to third scanning positions is shown.

FIG. 4A shows a schematic diagram of an arrangement of a plurality of ray sources according to some embodiments of the present disclosure, in which two ray sources are located at a first scanning position. FIG. 4B shows a schematic diagram of an arrangement of a plurality of ray sources according to some embodiments of the present disclosure, in which two ray sources are located at a second position. FIG. 4C shows a schematic diagram of an arrangement of a plurality of ray sources according to some embodiments of the present disclosure, in which two ray sources are located at a third scanning position. FIG. 4D shows a schematic diagram of an arrangement of a plurality of ray sources according to some embodiments of the present disclosure, in which a superposition state of two ray sources at first to third scanning positions is shown.

As shown in FIG. 4A, two ray sources 100 at the first scanning position may cover a first scanning angle. When the two ray sources 100 are located at the first scanning position, target spots 120 of the two ray sources 100 may sequentially emit X-rays in a predetermined order, while the conveying device 300 may transport the object to be inspected (shown as the shaded portion) through the inspection region. Then, the inspection system may complete a scanning process at the first scanning position.

After the scanning process at the first scanning position is completed, the two ray sources 100 may rotate around the rotation axis (for example, in a clockwise direction) to the second scanning position. As shown in FIG. 4B, the two ray sources 100 at the second scanning position may cover a second scanning angle. When the two ray sources 100 are located at the second scanning position, the target spots 120 of the two ray sources 100 may sequentially emit X-rays in a predetermined order, while the conveying device 300 may transport the object to be inspected through the inspection region again. Then, the inspection system may complete a scanning process at the second scanning position.

After the scanning process at the second scanning position is completed, the two ray sources 100 may rotate around the rotation axis (for example, in a clockwise direction) to the third scanning position. As shown in FIG. 4C, the two ray sources 100 at the third scanning position may cover a third scanning angle. When the two ray sources 100 are located at the third scanning position, target spots 120 of the two ray sources 100 may sequentially emit X-rays in a predetermined order, while the conveying device 300 may transport the object to be inspected through the inspection region again. Then, the inspection system may complete a scanning process at the third scanning position.

Through three scanning processes of the three ray sources 100 at the first to third scanning positions, as shown in FIG. 4D, the inspection system may combine the scanning angle at the first scanning position, the scanning angle at the second scanning position and the scanning angle at the third scanning position to generate a combined scanning angle. Therefore, the combined scanning angle generated by the inspection system through the rotation of the two ray sources 100 between the three scanning positions is equivalent to a scanning angle generated simultaneously by six ray sources 100.

Figure 5:
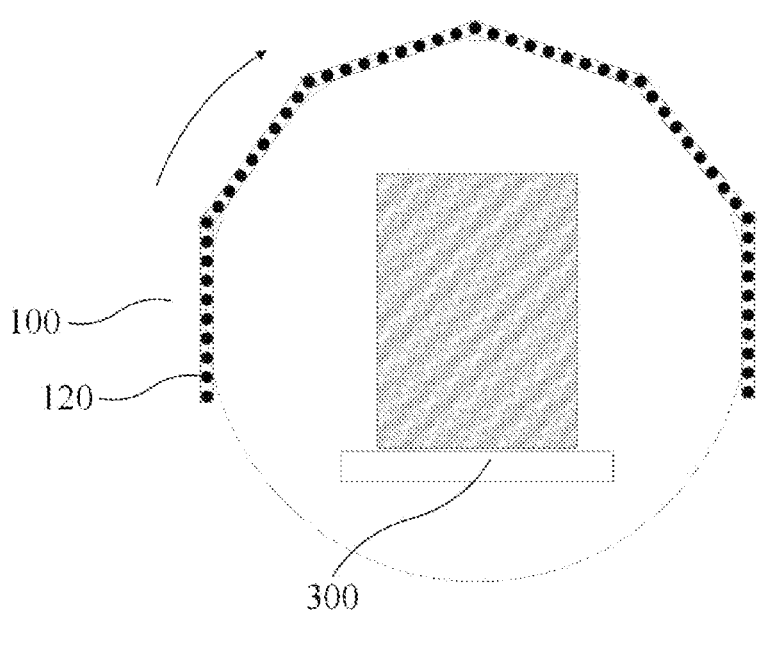
FIG. 5 shows a schematic diagram of a ray source according to some embodiments of the present disclosure, in which a superposition state of the ray source at first to sixth scanning positions is shown.

As described above, the inspection system includes a plurality of ray sources 100. However, embodiments of the present disclosure are not limited thereto. In some embodiments, the inspection system may include one ray source 100. In some embodiments, the ray source 100 may have six scanning positions. FIG. 5 shows a schematic diagram of one ray source according to some embodiments of the present disclosure, in which a superposition state of one ray source at first to sixth scanning positions is shown. For the rotation of one ray source 100 between different scanning positions and the plurality of scanning processes, reference may be made to each ray source 100 described above, and details will not be repeated here. Through six scanning processes of one ray source 100 at the first to sixth scanning positions, as shown in FIG. 5, the inspection system may combine the scanning angle at the first scanning position, the scanning angle at the second scanning position, . . . and the scanning angle at the sixth scanning position to generate a combined scanning angle. Therefore, the combined scanning angle generated by the inspection system through the rotation of one ray source 100 between the six scanning positions is equivalent to a scanning angle generated simultaneously by six ray sources 100.

According to some embodiments of the present disclosure, the inspection system may splice out a virtual ray source having a combined scanning angle through the rotation of the one or more ray sources 100 between different scanning positions. In an exemplary embodiment, the rotation of the one or more ray sources 100 of the inspection system between different scanning positions may achieve a combined scanning angle of continuous target spots, that is, the target spots of the virtual ray source are continuous. This is equivalent to a scanning angle generated simultaneously by a plurality of independent ray sources 100 arranged continuously (which together form a multi-segment broken line), or equivalent to a scanning angle generated by a multi-segment broken line type ray source having continuous target spots (the number of segments of the broken line here depends on the number of ray sources 100 and the number of scanning positions). Herein, the "continuous target spots" means that a spacing between the target spots of the spliced virtual ray source is less than or equal to a minimum target spot spacing that meets a requirement of an image spatial resolution of the inspection system.

According to some embodiments of the present disclosure, no target spots are provided at one or both ends of the ray source 100 in a circumferential direction. For example, as the ray source 100 may include components such as a frame structure at one or both ends in the circumferential direction, it may fail to provide target spots at the end(s) of the ray source 100 in the circumferential direction. In this case, if the plurality of ray sources 100 are connected end to end, there may be missing target spots in end regions of two adjacent ray sources 100. Similarly, if the virtual ray source spliced by the rotation of the one or more ray sources 100 between different scanning positions has a contour of a plurality of ray sources connected end to end, there may also be missing target spots in the virtual ray source.

In an exemplary embodiment, the rotation angle of the one or more ray sources 100 between different scanning positions may be selected so that the spliced virtual ray source has no missing target spots. According to some embodiments of the present disclosure, as shown in FIG. 3C, the rotation angle θ of each ray source 100 between two adjacent scanning positions is less than a scanning angle α of the ray source 100 relative to the rotation axis. In some embodiments, a rotation distance of each ray source 100 between two adjacent scanning positions is less than a length of the ray source 100 in a rotation direction. Thus, in the contour of the virtual ray source spliced by the one or more ray sources 100 during multiple scanning processes, the contour of the ray source before rotation and the contour of the ray source after rotation may partially overlap, so that missing target spots of the virtual ray source may be avoided.

According to some embodiments of the present disclosure, the inspection system is configured such that the one or more ray sources 100 are always located above the conveying device 300 during the rotation process. Thus, the ray source 100 is always located above the conveying device 300 during the entire scanning process, that is, it does not rotate below the conveying device 300, so that a height of the conveying device 300 may be reduced, which may facilitate loading and unloading of the object to be inspected. In addition, for example, when the object to be inspected is an aviation pallet cargo, if the ray source 100 is always located above the conveying device 300, it is possible to mitigate or avoid X-rays passing through a pallet of the aviation pallet cargo, thereby reducing or eliminating an impact of the pallet on the scanning imaging. For example, the pallet may contain high-density metal or plastic, etc., which is not conducive to X-ray fluoroscopy.

According to some embodiments of the present disclosure, the inspection system is configured such that the rotation range of the one or more ray sources 100 around the rotation axis is less than 360 degrees. Thus, the ray source 100 does not need to complete an entire circle of rotation, and the inspection system does not require slip rings and corresponding bearings, so that the size and manufacturing cost of the inspection system may be reduced, and the stability of the inspection system may be improved.

It should be understood that the rotation direction (clockwise or counterclockwise), the number of scanning positions, the order of passing the scanning positions, etc. described above are just illustrative, and should not be considered as limiting embodiments of the present disclosure.

As described above, a virtual ray source having continuous target spots may be spliced out through the rotation of the one or more ray sources 100. However, embodiments of the present disclosure are not limited thereto. In some embodiments, in the virtual ray source spliced by the rotation of the one or more ray sources 100, there may be a region where some target spots are missing, that is, the target spots of the spliced virtual ray source may be discontinuous. In a case of missing target spots, according to some embodiments of the present disclosure, the inspection system may perform data compensation, such as a data compensation algorithm, etc.

Three ray sources 100 with two scanning positions, two ray sources 100 with three scanning positions and one ray source 100 with six scanning positions are illustrated above by way of example in describing the virtual ray source spliced by the rotation of the one or more ray sources 100. However, embodiments of the present disclosure are not limited thereto. According to embodiments of the present disclosure, the inspection system may include more or fewer ray sources 100 and/or include more or fewer scanning positions.

According to some embodiments of the present disclosure, when viewed in the traveling direction, the one or more ray sources 100 of the inspection system may be translatable between at least two scanning positions.

According to some embodiments of the present disclosure, each ray source 100 has a scanning angle. Here, the "scanning angle" of each ray source 100 refers to an angle range of all the target spots of the ray source 100 relative to a central axis AX of the inspection region. The central axis of the inspection region is parallel to the traveling direction. Herein, the central axis of the inspection region refers to an axis that passes through an approximate center of a cross-section of the inspection region, and the cross-section of the inspection region is perpendicular to the traveling direction. When a ray source 100 translates from one scanning position to another scanning position, the scanning angle of the ray source 100 may rotate relative to the central axis. According to some embodiments of the present disclosure, a translation of each ray source 100 between different scanning positions may provide a combined scanning angle relative to the central axis. In some embodiments, when the inspection system includes a plurality of ray sources 100, the translation of the plurality of ray sources 100 between different scanning positions may also provide a combined scanning angle relative to the central axis. In some embodiments, the combined scanning angle generated by the translation of the one or more ray sources 100 between different scanning positions may be continuous or discontinuous.

According to some embodiments of the present disclosure, through the translation of the one or more ray sources 100 between different scanning positions, the inspection system may splice out a larger combined scanning angle and ray emission range. Therefore, the translation of the ray source 100 may generate a larger scanning angle than a fixed ray source.

According to some embodiments of the present disclosure, the inspection system may also reconstruct a three-dimensional scanning image of the object to be inspected based on the detection data of the detector assembly 200. In an exemplary embodiment, the translation of the one or more ray sources 100 of the inspection system between different scanning positions may generate a combined scanning angle greater than 180 degrees relative to the rotation axis. When the inspection system has a combined scanning angle greater than 180 degrees, the inspection system may generate more complete scanning data, and produce better CT scanning effect and better three-dimensional scanning image.

According to some embodiments of the present disclosure, a translation distance of each ray source 100 between two adjacent scanning positions is greater than a spacing between adjacent target spots of the ray source 100. Therefore, the translation of the ray source 100 between different scanning positions may generate a combined scanning angle to achieve a wider range of scanning. In some embodiments, the translation distance of each ray source 100 between two adjacent scanning positions is greater than the spacing between any two target spots of the ray source 100. In some embodiments, the translation distance of each ray source 100 between two adjacent scanning positions is substantially equal to a spacing between two farthest target spots of the ray source 100.

A structure of the one or more translatable ray sources according to some embodiments of the present disclosure will be described in detail below with reference to the accompanying drawings.

Figure 6A:
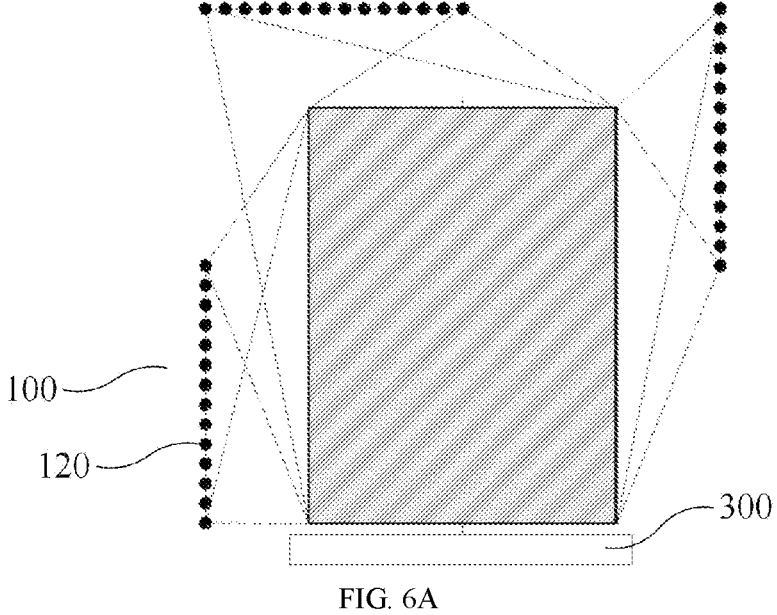
FIG. 6A shows a schematic diagram of an arrangement of a plurality of ray sources according to some embodiments of the present disclosure, in which three ray sources are located at a first scanning position.
Figure 6B:
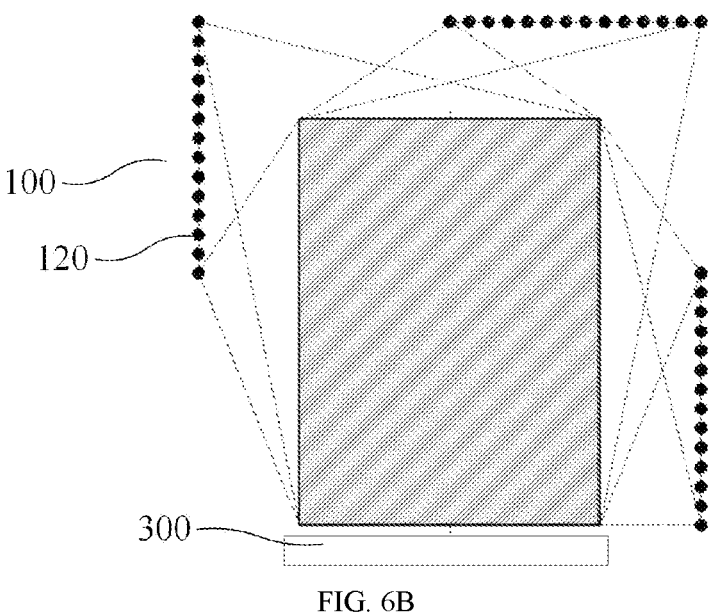
FIG. 6B shows a schematic diagram of an arrangement of a plurality of ray sources according to some embodiments of the present disclosure, in which three ray sources are located at a second scanning position.
Figure 6C:
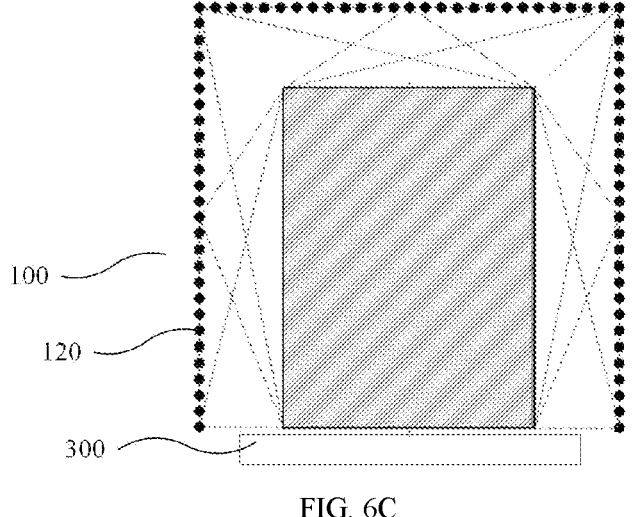
FIG. 6C shows a schematic diagram of an arrangement of a plurality of ray sources according to some embodiments of the present disclosure, in which a superposition state of three ray sources at first and second scanning positions is shown.

According to some embodiments of the present disclosure, as shown in FIG. 6A to FIG. 6C, each ray source 100 includes a plurality of target spots 120 spaced apart. It should be noted note that other structures of the ray source 100 are not shown in FIG. 6A to FIG. 6C. In an exemplary embodiment, the plurality of target spots 120 of each ray source 100 have a uniform spacing between target spots. In some embodiments, the plurality of target spots 120 of each ray source 100 are distributed along a straight line.

An inspection system including three ray sources 100 is illustrated by way of example in describing the following exemplary embodiment. In an exemplary embodiment, the three ray sources 100 are spaced apart from each other. The three ray sources 100 may be spaced around the inspection region. In some embodiments, each ray source 100 may have two scanning positions, and the ray source 100 is translatable between the two scanning positions. According to some embodiments of the present disclosure, when the inspection system includes a plurality of ray sources 100, the plurality of ray sources 100 may translate between different scanning positions synchronously.

FIG. 6A shows a schematic diagram of an arrangement of a plurality of ray sources according to some embodiments of the present disclosure, in which three ray sources are located at a first scanning position. FIG. 6B shows a schematic diagram of an arrangement of a plurality of ray sources according to some embodiments of the present disclosure, in which three ray sources are located at a second scanning position. FIG. 6C shows a schematic diagram of an arrangement of a plurality of ray sources according to some embodiments of the present disclosure, in which a superposition state of three ray sources at first and second scanning positions is shown.

In some embodiments, when viewed in the traveling direction, the three ray sources 100 are respectively arranged on left, upper and right sides of the inspection region, as shown in FIG. 6A and FIG. 6B. However, embodiments of the present disclosure are not limited thereto. It should be understood that the number and arrangement positions of the translatable ray sources, the number of scanning positions and the movement order of the scanning positions described herein are just illustrative and should not be considered as limiting embodiments of the present disclosure.

As shown in FIG. 6A, the three ray sources 100 at the first scanning position may cover a scanning angle. When the three ray sources 100 are located at the first scanning position, target spots 120 of the three ray sources 100 may sequentially emit X-rays in a predetermined order, while the conveying device 300 may transport the object to be inspected through the inspection region. Then, the inspection system may complete a scanning process at the first scanning position.

After the scanning process at the first scanning position is completed, the three ray sources 100 may translate to the second scanning position. As shown in FIG. 6B, the three ray sources 100 at the second scanning position may cover another scanning angle. When the three ray sources 100 are located at the second scanning position, target spots 120 of the three ray sources 100 may sequentially emit X-rays in a predetermined order, while the conveying device 300 may transport the object to be inspected through the inspection region again. Then, the inspection system may complete a scanning process at the second scanning position.

Through two scanning processes of the three ray sources 100 at the first scanning position and the second scanning position, as shown in FIG. 6C, the inspection system may combine the scanning angle at the first scanning position and the scanning angle at the second scanning position to generate a combined scanning angle. Therefore, the combined scanning angle generated by the inspection system through the translation of the three ray sources 100 between the two scanning positions is equivalent to a scanning angle generated simultaneously by six ray sources 100.

According to some embodiments of the present disclosure, the inspection system may splice out a virtual ray source having a combined scanning angle through the translation of the one or more ray sources 100 between different scanning positions. In an exemplary embodiment, the translation of the one or more ray sources 100 of the inspection system between different scanning positions may achieve a scanning angle of continuous target spots, that is, the target spots of the virtual ray source are continuous. This is equivalent to a scanning angle generated simultaneously by a plurality of independent ray sources arranged continuously (which together form a multi-segment broken line), or equivalent to a scanning angle generated by a multi-segment broken line type ray source having continuous target spots (the number of segments of the broken line here depends on the number of ray sources 100 and the number of scanning positions).

According to some embodiments of the present disclosure, no target spots are provided at one or both ends of the ray source 100 in a circumferential direction. For example, as the ray source 100 may include components such as a frame structure at one or both ends in the circumferential direction, it may fail to provide target spots at the end(s) of the ray source 100 in the circumferential direction. In this case, if the plurality of ray sources 100 are connected end to end, there may be missing target spots in end regions of two adjacent ray sources 100. Similarly, if the virtual ray source spliced by the translation of the one or more ray sources 100 between different scanning positions has a contour of a plurality of ray sources connected end to end, there may also be missing target spots in the virtual ray source.

In an exemplary embodiment, in order to achieve continuous target spots, the translation distance of the one or more ray sources 100 between different scanning positions may be selected so that the spliced virtual ray source has no missing target spots. According to some embodiments of the present disclosure, the translation distance of each ray source 100 between two adjacent scanning positions is less than a length of the ray source in the translation direction. Then, in the contour of the virtual ray source spliced by the one or more ray sources 100 during multiple scanning processes, the contour of the ray source before translation and the contour of the ray source after translation may partially overlap, so that missing target spots of the virtual ray source may be avoided.

As described above, the ray source 100 translates once, that is, the ray source 100 has two scanning positions. However, embodiments of the present disclosure are not limited thereto. In some embodiments, the one or more ray sources 100 of the inspection system may translate multiple times, that is, translate between at least three scanning positions.

As described above, the one or more ray sources may rotate or translate between different scanning positions. However, embodiments of the present disclosure are not limited thereto. In some embodiments, the ray source(s) of the inspection system may always remain stationary, that is, neither rotating nor translating. For example, the inspection system may include a plurality of ray sources 100 arranged continuously, and the plurality of ray sources 100 have a scanning angle greater than 180 degrees around the inspection region. In this case, when the inspection system performs an inspection on an object to be inspected, the plurality of ray sources 100 do not need to rotate or translate, and the conveying device 300 only needs to transport the object to be inspected through the inspection region once, without the need of reciprocally transporting the object to be inspected through the inspection region.

As described above, the plurality of ray sources 100 rotate or translate between different scanning positions synchronously. However, embodiments of the present disclosure are not limited thereto. In some embodiments, when the inspection system includes a plurality of ray sources 100, the plurality of ray sources 100 may rotate or translate between different scanning positions asynchronously.

As described above, the plurality of target spots in each ray source 100 are arranged along a straight line. However, embodiments of the present disclosure are not limited thereto. In some embodiments, the plurality of target spots in the ray source 100 may also be arranged along an arc line, a broken line, etc.

As described above, the plurality of target spots in the ray source 100 has a uniform spacing between target spots. However, embodiments of the present disclosure are not limited thereto. In some embodiments, the plurality of target spots in the ray source 100 may also be arranged non-uniformly, that is, the target spots may have non-uniform spacing.

As described above, the ray sources 100 are spaced apart. However, embodiments of the present disclosure are not limited thereto. In some embodiments, different ray sources 100 may also be arranged continuously. For example, in a case that the inspection system includes three ray sources 100, the three ray sources 100 may be arranged continuously and sequentially: or two of the three ray sources 100 may be arranged continuously, and the remaining ray source 100 may be spaced apart from the two ray sources 100.

A structure of the detector assembly according to some embodiments of the present disclosure will be described in detail below with reference to the accompanying drawings. According to some embodiments of the present disclosure, the detector assembly 200 is rotatable around the rotation axis. In an exemplary embodiment, the detector assembly 200 rotates around the rotation axis synchronously with, that is, co-rotate with the one or more ray sources 100 of the inspection system.

According to some embodiments of the present disclosure, the detector assembly 200 includes a plurality of detector units. In some embodiments, an arrangement of the detector units in the detector assembly 200 may be determined according to factors such as the arrangement of the ray sources 100 and/or the size of the object to be inspected. In some embodiments, for the arrangement of the detector units in the detector assembly 200, a cost-effective arrangement may be adopted, that is, the number of detector units is minimized to meet imaging needs.

Figure 7:
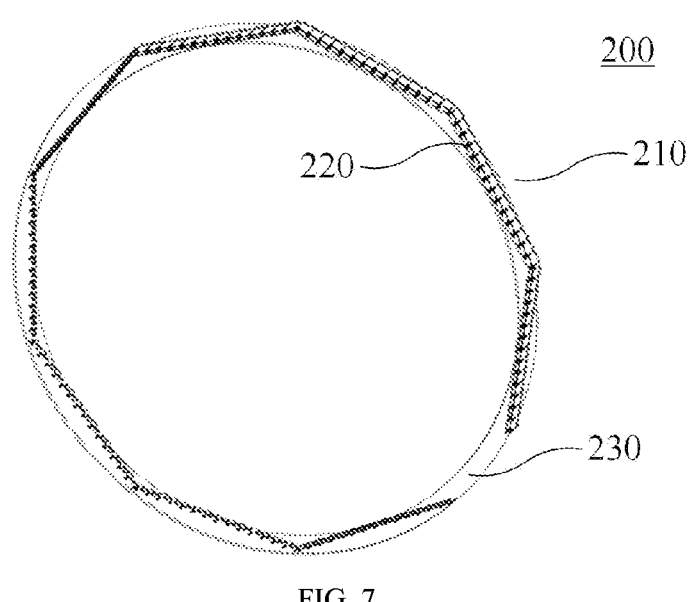
FIG. 7 shows a schematic diagram of a detector assembly according to some embodiments of the present disclosure.

FIG. 7 shows a schematic diagram of a detector assembly according to some embodiments of the present disclosure. According to some embodiments of the present disclosure, the detector assembly 200 includes a plurality of detector arms 210, and each detector arm 210 is provided with a plurality of detector units 220.

In an exemplary embodiment, the plurality of detector arms 210 of the detector assembly 200 extend completely around the inspection region. Thus, the plurality of detector arms 210 form a complete and continuous detector ring. In some embodiments, the detector ring may be a circular ring, an elliptical ring, a square ring, a rectangular ring, a polygonal ring, etc.

As described above, the plurality of detector arms 210 form a complete detector ring. However, embodiments of the present disclosure are not limited thereto. In some embodiments, the detector ring formed by the plurality of detector arms 210 may be incomplete, that is, it may include a gap: or the plurality of detector arms 210 may be spaced around the inspection region.

In some embodiments, when the inspection system includes a plurality of ray sources 100, each detector arm 210 of the detector assembly 200 may receive X-rays emitted by at least two ray sources 100. Thus, each detector arm 210 may be shared by at least two ray sources 100. In an exemplary embodiment, when the inspection system includes a plurality of ray sources 100, all target spots of the plurality of ray sources 100 are located in a same plane, that is, the plurality of ray sources 100 are coplanar. Herein, "the target spots are located in a same plane" means that beam exit points of the target spots are all located in a same plane. In some embodiments, when the inspection system includes a plurality of ray sources 100 that are coplanar, each detector arm 210 of the detector assembly 200 may receive X-rays emitted by at least two ray sources 100.

As described above, the detector assembly 200 is rotatable around the rotation axis. However, embodiments of the present disclosure are not limited thereto. In some embodiments, the detector assembly 200 may not rotate. In some embodiments, the detector assembly 200 may also be rotatable around the rotation axis, but not rotate with the one or more ray sources 100 synchronously.

In some embodiments, the inspection system may also include a rotary bracket 400, as shown in FIG. 2. The rotary bracket 400 may rotate around the rotation axis. In an exemplary embodiment, the one or more ray sources 100 and the detector assembly 200 are installed on the rotary bracket 400. Therefore, a synchronous rotation of the ray source 100 and the detector assembly 200 may be achieved through the rotary bracket 400. In some embodiments, the inspection system may also include a supporting frame 410, which is used to rotatably support the rotary bracket 400.

In some embodiments, the detector assembly 200 may also include a detector turntable 230. The plurality of detector arms 210 may be installed on the detector turntable 230. The detector turntable 230 may be fixed to the rotary bracket 400. Then, the rotary bracket 400 may drive the detector turntable 230 to rotate and drive all the detector arms 210 to rotate together. In an exemplary embodiment, the detector turntable 230 may be detachably fixed to the rotary bracket 400. For example, by removing a connection between the detector turntable 230 and the rotary bracket 400, the detector turntable 230 may rotate relative to the rotary bracket 400, which may facilitate maintenance or replacement of the detector arm 210 installed on the detector turntable 230.

According to some embodiments of the present disclosure, as shown in FIG. 2, the inspection system may also include a shielding component 500. In an exemplary embodiment, the shielding component 500 may be arranged around the inspection region of the inspection system. In an exemplary embodiment, the one or more ray sources 100 are arranged outside the inspection region, that is, on a side of the shielding component 500 away from the inspection region. In an exemplary embodiment, the detector assembly 200 is arranged outside the inspection region, that is, on a side of the shielding component 500 away from the inspection region. It should be noted that the shielding component 500 is used to shield rays, and openings may be provided at corresponding positions of the ray source 100 and the detector assembly 200 to prevent the rays from being blocked.

Figure 12:
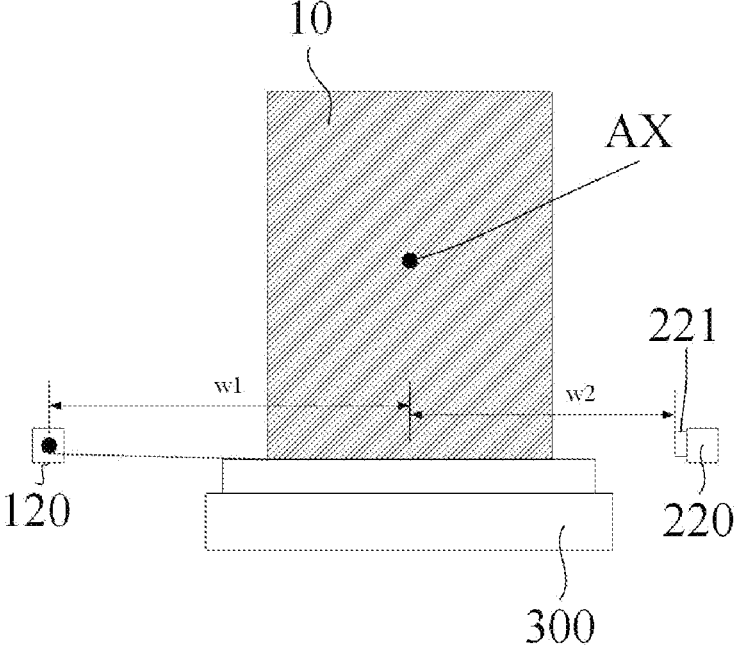
FIG. 12 shows a schematic cross-sectional view of an inspection system taken along a plane parallel to a rotation axis, according to some embodiments of the present disclosure.

According to some embodiments of the present disclosure, the detector assembly 200 is arranged radially closer to the rotation axis or the central axis of the inspection region than the ray source 100. As shown in FIG. 12, a distance w2 between the detector assembly 200 and the rotation axis AX is less than a distance w1 between the ray source 100 and the rotation axis AX. In some embodiments, when the inspection system includes a plurality of ray sources 100, the detector assembly 200 is arranged radially closer to the rotation axis or the central axis of the inspection region than all the ray sources 100. Thus, the detector assembly 200 is positioned radially inward of the one or more ray sources 100.

According to some embodiments of the present disclosure, the inspection system is configured such that the X-rays emitted by each ray source 100 may not be blocked by the detector assembly 200 before passing through the inspection region. In an exemplary embodiment, each detector unit 220 of the detector assembly 200 does not block X-rays emitted by one or more ray sources 100 on the same side as the detector unit 220, and may receive X-rays emitted by one or more ray sources 100 on another side. Here, "the same side" means that the detector unit 220 overlaps at least partially with the ray source(s) 100 when viewed in the radial direction.

Figure 8:
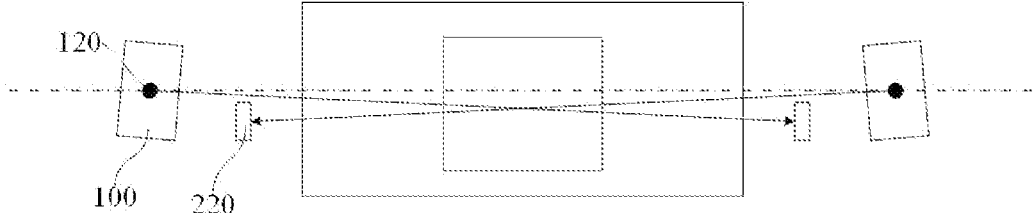
FIG. 8 shows a schematic diagram of a ray source and a detector unit according to some embodiments of the present disclosure.

A relative position of the ray source and the detector unit according to some embodiments of the present disclosure will be described in detail below with reference to the accompanying drawings. FIG. 8 shows a schematic diagram of a ray source and a detector unit according to some embodiments of the present disclosure. In an exemplary embodiment, as shown in FIG. 8, all ray sources 100 (only two ray sources 100 are shown in FIG. 8) deflect an angle toward the detector assembly 200 along the rotation axis or along the central axis of the inspection region. In some embodiments, each ray source 100 deflects about the axis of the target spot 120 of the ray source 100. In some embodiments, a deflection angle of the ray source 100 is less than or equal to 1.5 degrees. In some embodiments, the ray emission direction of the ray source 100 is not perpendicular to the rotation axis or the central axis of the inspection region.

By deflecting the ray source 100 relative to the detector assembly 200, the X-rays emitted by the ray source 100 may avoid the detector unit 220 of the detector assembly 200 on the same side, and may be received by the detector unit 220 of the detector assembly 200 on another side.

Figure 9:
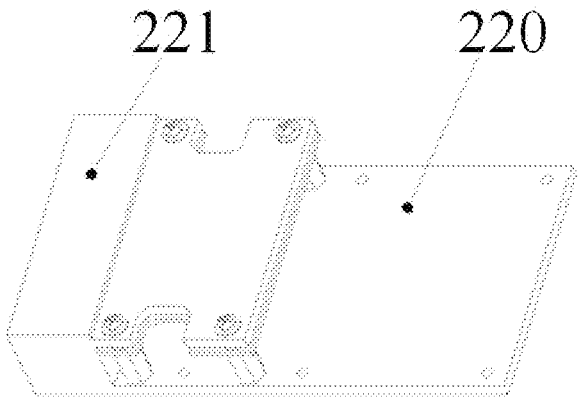
FIG. 9 shows a schematic diagram of a detector unit according to some embodiments of the present disclosure.

A specific structure of the detector unit according to some embodiments of the present disclosure will be described in detail below with reference to the accompanying drawings. FIG. 9 shows a schematic diagram of the detector unit according to some embodiments of the present disclosure. As shown in FIG. 9, each detector unit 220 includes a detector crystal 221. In an exemplary embodiment, the detector crystal 221 is provided at an end of the detector unit 220 facing the ray source 100 along the rotation axis or along the central axis of the inspection region. Therefore, each detector unit 220 may not block X-rays emitted by the ray source 100 on the same side while receiving X-rays emitted by the ray source 100 on another side.

In some embodiments, the ray source 100 and the detector unit 220 of the detector assembly 200 on the same side at least partially overlap in the axial direction. The detector crystal 221 of the detector unit 220 is arranged close to an edge of an X-ray beam emitted by the ray source 100 on the same side, so as to avoid blocking X-rays emitted by the ray source 100 on the same side.

In an exemplary embodiment, all the detector crystals 221 of the detector assembly 200 are located in a same plane. Herein, "the detector crystals are located in a same plane" means that center planes of the detector crystals are all located in a same plane. For example, the center planes of all the detector crystals 221 of the detector assembly 200 are located in the same plane through a same positioning reference.

As described above, all the target spots of the plurality of ray sources 100 are located in the same plane, that is, the plurality of ray sources 100 are coplanar. However, embodiments of the present disclosure are not limited thereto. In some embodiments, the target spots of the plurality of ray sources 100 may be arranged to be non-coplanar. For example, different ray sources 100 may be staggered with each other in the axial direction.

In a large object such as an aviation pallet cargo, the items inside often pile up and overlap. In order to obtain more internal details in the perspective scanning, it is often needed to increase the number of target spots so that the target spot spacing is less than a predetermined value, thereby improving the spatial resolution of the image through a scanning method with densified sampling.

According to some embodiments of the present disclosure, the one or more ray sources 100 may move locally to achieve the densified sampling. In some embodiments, when viewed along the rotation axis or the traveling direction, each ray source 100 is configured to be locally movable between a plurality of target spot positions. Herein, the "target spot position" refers to a position used to increase a density of target spots and enable a complete of the scanning process. In an exemplary embodiment, after the inspection system completes the scanning process at a scanning position, the ray source may move from a current scanning position (as a target spot position) to a next target spot position. In this case, the plurality of target spot positions include the current scanning position.

According to some embodiments of the present disclosure, the one or more ray sources 100 of the inspection system may move locally once or multiple times to increase the density of target spots, with two or more target spot positions. The inspection system performs a scanning process at each target spot position. According to some embodiments of the present disclosure, a local movement of the ray source 100 may include a rotation or a translation.

A structure of the one or more ray sources that are movable locally according to some embodiments of the present disclosure will be described in detail below with reference to the accompanying drawings. An inspection system including three ray sources 100 that translate at different target spot positions is illustrated by way of example in describing the following exemplary embodiment.

Figures 10A, 10B:
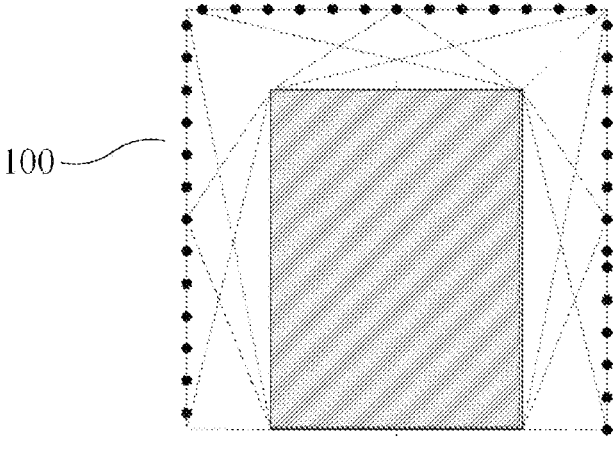
FIG. 10A shows a schematic diagram of an arrangement of a plurality of ray sources according to some embodiments of the present disclosure, in which three ray sources are located at a first target spot position.
FIG. 10B shows a schematic diagram of an arrangement of a plurality of ray sources according to some embodiments of the present disclosure, in which three ray sources are located at a second target spot position.

FIG. 10A shows a schematic diagram of an arrangement of a plurality of ray sources according to some embodiments of the present disclosure, in which three ray sources are located at a first target spot position. When the three ray sources 100 are located at the first target spot position, the three ray sources 100 may complete a scanning process at the first target spot position.

FIG. 10B shows a schematic diagram of an arrangement of a plurality of ray sources according to some embodiments of the present disclosure, in which three ray sources are located at a second target spot position. After completing the scanning process at the first target spot position, the three ray sources 100 may move to the second target spot position. When the three ray sources 100 are located at the second target spot position, the three ray sources 100 may complete another scanning process at the second target spot position.

Figure 10C:
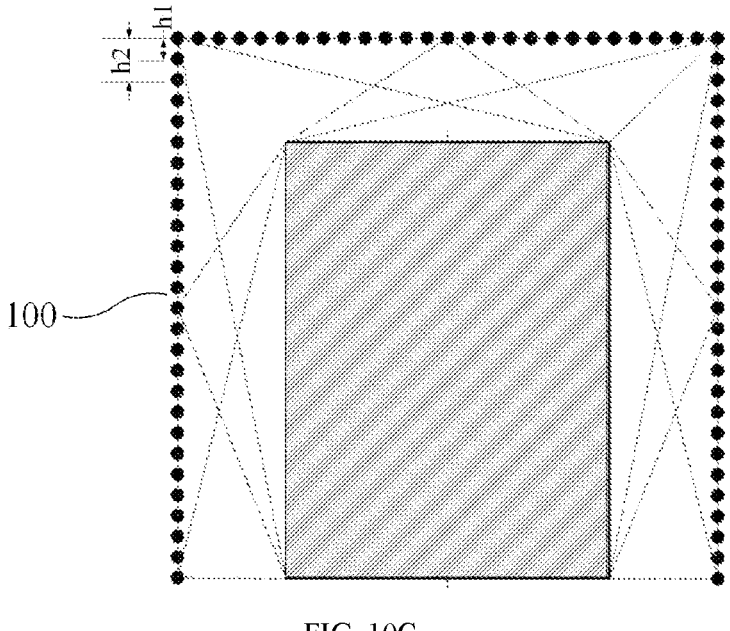
FIG. 10C shows a schematic diagram of an arrangement of a plurality of ray sources according to some embodiments of the present disclosure, in which a superposition state of three ray sources at first and second target spot positions is shown.

FIG. 10C shows a schematic diagram of an arrangement of a plurality of ray sources according to some embodiments of the present disclosure, in which a superposition state of three ray sources at first and second target spot positions is shown. Through two scanning processes of the three ray sources 100 at the first target spot position and the second target spot position, as shown in FIG. 10C, the inspection system may combine a target spot distribution at the first target spot position and a target spot distribution at the second target spot position to generate a combined target spot distribution. Therefore, the inspection system may increase the density of target spots through the combined target spot distribution generated by the translation of the three ray sources 100 between the two target spot positions, so that the spatial resolution of the perspective image may be improved through the scanning method with densified sampling.

According to some embodiments of the present disclosure, a movement distance of each ray source 100 between two adjacent target spot positions is less than a movement distance of the ray source 100 between two adjacent scanning positions. In some embodiments, a rotation angle of each ray source 100 between two adjacent target spot positions (that is, an angle of two adjacent target spot positions relative to the rotation axis or the central axis of the inspection region) is less than a rotation angle of the ray source 100 between two adjacent scanning positions. Therefore, the local movement of the ray source between different target spot positions is different from a larger-scale movement of the ray source between different scanning positions. The local movement of the ray source between different target spot positions is used to generate a combined target spot distribution to achieve a local target spot densification, while the movement of the ray source between different scanning positions is used to generate a combined scanning angle to achieve a wider range of scanning.

In some embodiments, the rotation angle of each ray source 100 between two adjacent target spot positions is less than the angle of two adjacent target spots of the ray source 100 relative to the rotation axis or the central axis of the inspection region. In some embodiments, as shown in FIG. 10C, a movement distance h1 of each ray source 100 between two adjacent target spot positions is less than a target spot spacing h2 between adjacent target spots of the ray source 100. In some embodiments, the movement distance of each ray source 100 between two adjacent target spot positions may be half or one-third, etc. of the target spot spacing. For example, when the movement distance of each ray source 100 between two adjacent target spot positions is half of the target spacing, the ray source 100 may have double the target spot density; and when the movement distance of each ray source 100 between two adjacent target spot positions is one-third of the target spot spacing, the ray source 100 may have three times the target spot density.

According to some embodiments of the present disclosure, a movement distance of each ray source 100 between two farthest target spot positions is less than the target spot spacing between two adjacent target spots of the ray source 100. In some embodiments, a rotation angle of each ray source 100 between two farthest target spot positions is less than an angle of two adjacent target spots of the ray source 100 relative to the rotation axis or the central axis of the inspection region. Thus, the movement of the ray source 100 between different target spot positions is a local movement within the target spot spacing. Therefore, such local movement of the ray source 100 may increase the target spot density more effectively.

According to some embodiments of the present disclosure, the inspection system may be configured such that the one or more ray sources 100 do not emit X-rays when the one or more ray sources 100 move between different target spot positions. Therefore, when a target spot densification is required, one or more ray sources 100 stop emitting X-rays, and then move from a current target spot position to another target spot position.

As described above, the ray source 100 translates between different target spot positions to achieve the target densification. However, embodiments of the present disclosure are not limited thereto. In some embodiments, the ray source 100 may also achieve the target densification by rotating between different target spot positions. For the rotation of the ray source 100 between different target spot positions, reference may be made to the rotation of the ray source 100 between different scanning positions described above, which will not be repeated here.

An inspection method according to some embodiments of the present disclosure will be described in detail below: According to some embodiments of the present disclosure, the inspection method may be implemented using any of the inspection systems described above.

In step S10, the object to be inspected is carried on the conveying device 300 of the inspection system.

In step S20, the one or more ray sources 100 of the inspection system are located at one of a plurality of scanning positions around the inspection region.

In step S30, the one or more ray sources 100 and the detector assembly 200 move in the traveling direction relative to the conveying device 300 so that the object to be inspected may enter the inspection region, while the one or more ray sources 100 emit X-rays so that the X-rays pass through the object to be inspected located in the inspection region and are received by the detector assembly 200. When the one or more ray sources 100 and the detector assembly 200 translate a predetermined distance relative to the conveying device 300 so that, for example, the object to be inspected completely passes through the inspection region (for example, a rear end of the object to be inspected completely passes through a beam surface of X-rays), a scanning process is completed. In some embodiments, the rotation angle of each ray source 100 between two adjacent scanning positions is greater than the angle of adjacent target spots of the ray source 100 relative to the rotation axis.

In an exemplary embodiment, the object to be inspected is an aviation pallet cargo, or known as an air container. However, embodiments of the present disclosure are not limited thereto. According to some embodiments of the present disclosure, the inspection method may also be used to inspect other types of objects, especially an object with a large size.

In step S40, the one or more ray sources 100 rotate to another one of the plurality of scanning positions around the rotation axis, and step S30 is repeated to complete the scanning process at each of the plurality of scanning positions.

Figure 11A:
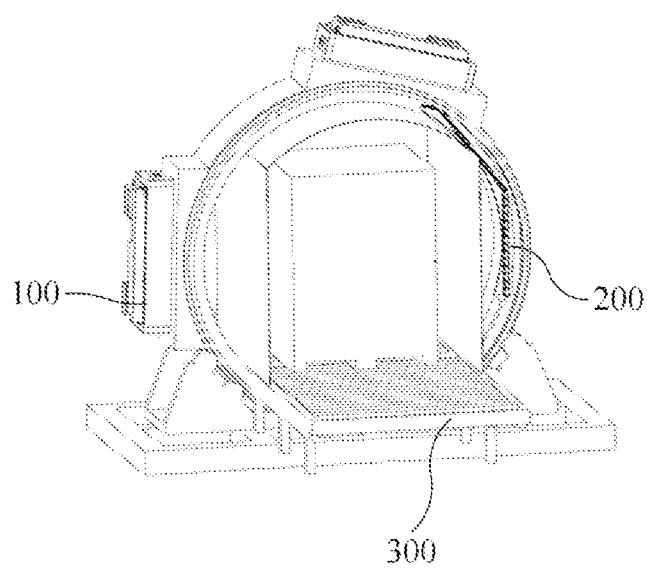
FIG. 11A to FIG. 11C respectively show schematic diagrams of implementing an inspection method by using an inspection system according to some embodiments of the present disclosure.
Figure 11B:
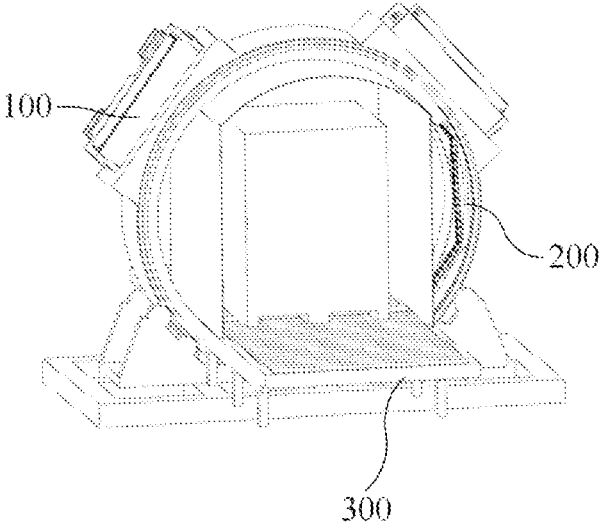
Figure 11C:
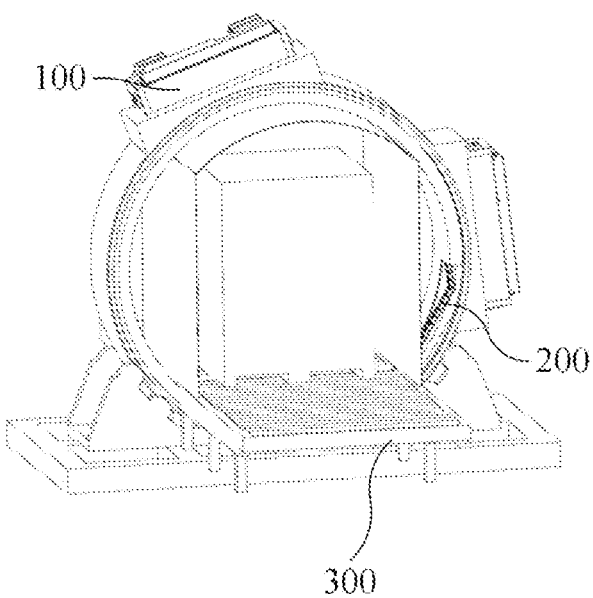

The use of two ray sources 100 each having three scanning positions is illustrated by way of example with reference to the accompanying drawings in describing the following exemplary embodiment. FIG. 11A to FIG. 11C respectively show schematic diagrams of implementing an inspection method by using an inspection system according to some embodiments of the present disclosure.

As shown in FIG. 11A, the two ray sources 100 of the inspection system are located at a first scanning position among the three scanning positions around the inspection region. Then, the conveying device 300 transports the object to be inspected in the traveling direction (first direction), from a first end through the inspection region, while the two ray sources 100 emit X-rays. The emitted X-rays pass through the object to be inspected located in the inspection region and are received by the detector assembly 200. When the object to be inspected completely passes through the inspection region, the two ray sources 100 stop emitting X-rays, and the conveying device 300 stops transporting the object to be inspected. Then, a scanning process at the first scanning position is completed.

After the scanning process at the first scanning position is completed, as shown in FIG. 11B, the two ray sources 100 may rotate (in a clockwise direction as shown in FIG. 11A to FIG. 11C) to a second scanning position. Then, the conveying device 300 transports the object to be inspected in the traveling direction (second direction), from a second end through the inspection region, while the two ray sources 100 emit X-rays. The emitted X-rays pass through the object to be inspected located in the inspection region and are received by the detector assembly 200. When the object to be inspected completely passes through the inspection region, the two ray sources 100 stop emitting X-rays, and the conveying device 300 stops transporting the object to be inspected. Then, a scanning process at the second scanning position is completed.

After the scanning process at the second scanning position is completed, as shown in FIG. 11C, the two ray sources 100 may continue to rotate (in the clockwise direction as shown in FIG. 11A to FIG. 11C) to a third scanning position. Then, the conveying device 300 transports the object to be inspected in the traveling direction (first direction), from the first end through the inspection region, while the two ray sources 100 emit X-rays. The emitted X-rays pass through the object to be inspected located in the inspection region and are received by the detector assembly 200. When the object to be inspected completely passes through the inspection region, the two ray sources 100 stop emitting X-rays, and the conveying device 300 stops transporting the object to be inspected. Then, a scanning process at the third scanning position is completed.

An implementation process of the inspection method has been described above by taking the example of using two ray sources 100 each having three scanning positions. When more or fewer ray sources 100 are used and/or each ray source 100 has more or fewer scanning positions, the inspection method may be performed similarly, as long as the scanning process at each of the plurality of scanning positions may be completed, and the specific steps will not be repeated here.

In an exemplary embodiment, the inspection method may also include, after step S30, reconstructing a three-dimensional scanning image (CT image) of the object to be inspected based on the detection data of the detector assembly 200.

One or more ray sources 100 are used in the inspection method described above. In a case of a plurality of ray sources 100, the vacuum spaces of different ray sources 100 are not connected.

In some embodiments, such as the embodiments shown in FIG. 11A to FIG. 11C, the conveying device 300 stops moving the object to be inspected after each time the object to be inspected completely passes through the inspection region. In two adjacent repetitions of step S20, that is, in two adjacent movements of the object to be inspected through the inspection region, the object to be inspected is moved in opposite directions. Thus, a scanning process may be performed on the object to be inspected each time the object to be inspected passes through the inspection region, so that the inspection efficiency and the object passing rate may be improved. However, embodiments of the present disclosure are not limited thereto. In some embodiments, the inspection method may be implemented to transport the object to be inspected through the inspection region in a same direction in each scanning process.

According to some embodiments of the present disclosure, the rotation angle of each ray source 100 between two adjacent scanning positions is less than the scanning angle of the ray source 100 relative to the rotation axis. With reference to the above description, a plurality of scanning processes of the inspection method may achieve a combined scanning angle of continuous target spots.

In some embodiments, the conveying device 300 transports the object to be inspected in a uniform linear motion. In some embodiments, the ray source 100 stops emitting X-rays after each time the aviation pallet cargo to be inspected passes through the inspection region.

In some embodiments, step S20 and step S30 of the inspection method are repeated so that the one or more ray sources 100 have a combined scanning angle greater than 180 degrees relative to the rotation axis. When the inspection method provides a combined scanning angle greater than 180 degrees, it is possible to produce more complete scanning data and better CT scanning result.

In some embodiments, during the rotation of the one or more ray sources 100, the one or more ray sources 100 are always located above the conveying device 300. Therefore, the ray source 100 is always located above the conveying device 300 during the entire scanning process, that is, it does not rotate below the conveying device 300, so that the height of the conveying device 300 may be reduced, which facilitates loading and unloading of the object to be inspected. In addition, for example, when the object to be inspected is an aviation pallet cargo, if the ray source 100 is always located above the conveying device 300, it is possible to mitigate or avoid X-rays passing through a pallet of the aviation pallet cargo, thereby reducing or eliminating an impact of the pallet on the scanning imaging. The pallet may contain, for example, high-density metal or plastic, etc.

In some embodiments, the inspection method may also include, after completing a scanning process at a scanning position in step S20, moving the one or more ray sources 100 to one of a plurality of target spot positions and repeatedly performing step S20. The plurality of target spot positions include the current scanning position. In this case, the inspection method may achieve densified sampling through a local movement of the ray source 100. For other implementations of densified sampling or target spot densification, reference may be made to the above description, and details will not be repeated here.

Other implementations of the inspection system used in the inspection method according to some embodiments of the present disclosure may refer to the above description and may be accordingly incorporated into embodiments of the inspection method, and details will not be described here.

Figure 13:
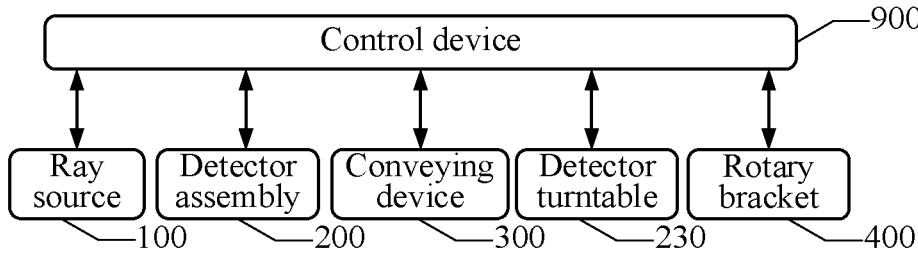
FIG. 13 schematically shows a block diagram of an inspection system according to some embodiments of the present disclosure.
Figure 14:
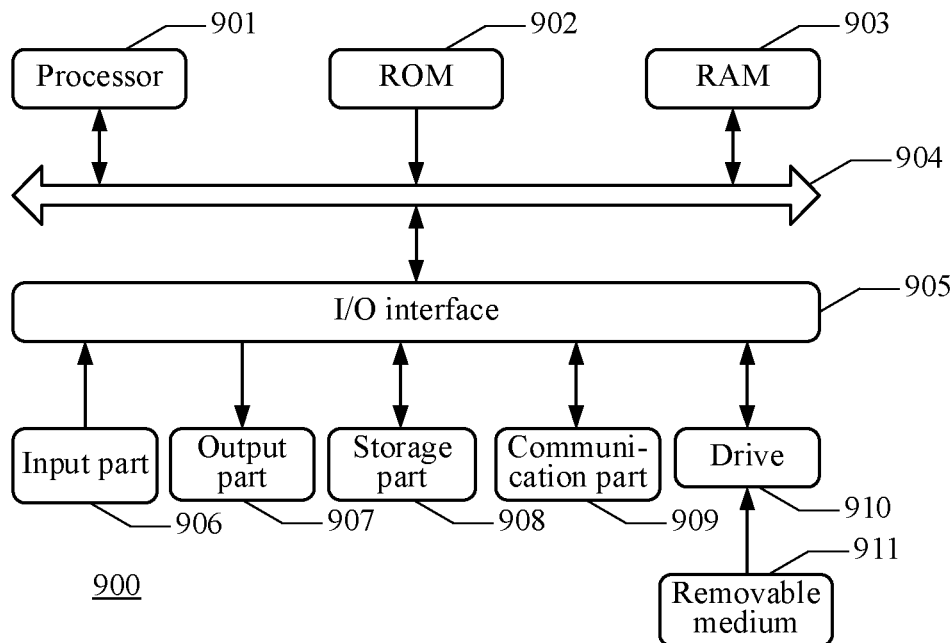
FIG. 14 schematically shows a block diagram of a control device according to some embodiments of the present disclosure.

It should be understood that the inspection system according to some embodiments of the present disclosure may include a control device 900. FIG. 13 schematically shows a block diagram of an inspection system according to some embodiments of the present disclosure. FIG. 14 schematically shows a block diagram of a control device according to some embodiments of the present disclosure. With reference to FIG. 13 and FIG. 14, the control device 900 may be communicatively connected to the ray source 100, the detector assembly 200, the conveying device 300, the detector turntable 230, the rotary bracket 400 and other components in the inspection system. The control device 900 may output various control signals to cause the ray source 100, the detector assembly 200, the conveying device 300, the detector turntable 230 and the rotary bracket 400 in the inspection system to perform various steps or actions in the inspection method described above.

As shown in FIG. 14, an electronic device 900 according to embodiments of the present disclosure includes a processor 901, which may execute various appropriate actions and processing according to a program stored in a read only memory (ROM) 902 or a program loaded into a random access memory (RAM) 903 from a storage part 908. The processor 901 may include, for example, a general-purpose microprocessor (for example, CPU), an instruction set processor and/or a related chipset and/or a special-purpose microprocessor (for example, an application specific integrated circuit (ASIC)), and the like. The processor 901 may further include an on-board memory for caching purposes. The processor 901 may include a single processing unit or a plurality of processing units for executing different actions of the inspection method according to embodiments of the present disclosure.

Various programs and data required for operations of the electronic device 900 are stored in the RAM 903. The processor 901, the ROM 902 and the RAM 903 are connected to each other through a bus 904. The processor 901 executes various operations or actions of the inspection method according to embodiments of the present disclosure by executing the programs in the ROM 902 and/or the RAM 903. It should be noted that the program may also be stored in one or more memories other than the ROM 902 and the RAM 903. The processor 901 may also execute various operations or actions of the inspection method according to embodiments of the present disclosure by executing the programs stored in the one or more memories.

According to embodiments of the present disclosure, the electronic device 900 may further include an input/output (I/O) interface 905 which is also connected to the bus 904. The electronic device 900 may further include one or more of the following components connected to the I/O interface 905: an input part 906 including a keyboard, a mouse, etc.: an output part 907 including a cathode ray tube (CRT), a liquid crystal display (LCD), etc. and a speaker, etc.: a storage part 908 including a hard disk, etc.; and a communication part 909 including a network interface card such as a LAN card, a modem, and the like. The communication part 909 performs communication processing via a network such as the Internet. A drive 910 is also connected to the I/O interface 905 as required. A removable medium 911, such as a magnetic disk, an optical disk, a magneto-optical disk, a semiconductor memory, and the like, is installed on the drive 910 as required, so that the computer program read therefrom is installed into the storage part 908 as needed.

Embodiments of the present disclosure further provide a computer-readable storage medium, which may be included in the apparatus/device/system described in the aforementioned embodiments: or exist alone without being assembled into the apparatus/device/system. The computer-readable storage medium carries one or more programs that when executed, perform the inspection method according to embodiments of the present disclosure.

According to embodiments of the present disclosure, the computer-readable storage medium may be a non-transitory computer-readable storage medium, for example, which may include but not be limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In embodiments of the present disclosure, the computer-readable storage medium may be any tangible medium that contains or stores programs that may be used by or in combination with an instruction execution system, apparatus or device. For example, according to embodiments of the present disclosure, the computer-readable storage medium may include the above-mentioned ROM 902 and/or RAM 903 and/or one or more memories other than the ROM 902 and RAM 903.

Embodiments of the present disclosure further include a computer program product, which contains a computer program. The computer program contains program codes for performing the methods shown in flowcharts. When the computer program product runs on a computer system (such as the above-mentioned inspection system), the program codes are used to cause the electronic device to implement the inspection method provided in embodiments of the present disclosure.

When the computer program is executed by the processor 901, the functions defined in the system/apparatus of embodiments of the present disclosure are performed. According to embodiments of the present disclosure, the above-mentioned systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 909, and/or installed from the removable medium 911. The program codes contained in the computer program may be transmitted by any suitable network medium, including but not limited to a wireless one, a wired one, or any suitable combination of the above.

In such embodiments, the computer program may be downloaded and installed from the network via the communication part 909 and/or installed from the removable medium 911. When the computer program is executed by the processor 901, the above-mentioned functions defined in the systems of embodiments of the present disclosure are performed. According to embodiments of the present disclosure, the systems, apparatuses, devices, modules, units, etc. described above may be implemented by computer program modules.

According to embodiments of the present disclosure, the program codes for executing the computer programs provided by embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program codes may be completely executed on a user computing device, partially executed on a user device, partially executed on a remote computing device, or completely executed on a remote computing device or a server. In a case of involving a remote computing device, the remote computing device may be connected to the user computing device through any kind of network, including local area network (LAN) or wide area network (WAN), or may be connected to an external computing device (e.g., through the Internet using an Internet service provider).

It should be noted that herein, unless otherwise stated, the expression "the inspection system is configured to . . . " means that the processor 901 may generate a control signal according to a program stored in the read only memory (ROM) 902 or a program loaded from the storage part 908 into the random access memory (RAM) 903, so as to control the ray source 100, the detector assembly 200, the conveying device 300, the detector turntable 230, the rotary bracket 400 and other components in the inspection system to perform various steps or actions in the inspection method described above.

Embodiments of the present disclosure provide an inspection system and an inspection method in which a dynamic-static combined scanning method is used, especially an inspection system and an inspection method for an aviation pallet cargo. An inspection system and an inspection method that meet the needs of CT reconstruction are also provided, especially an inspection system and an inspection method for an aviation pallet cargo. An inspection system and an inspection method that may improve spatial resolution and recognition accuracy are also provided, especially an inspection system and an inspection method for an aviation pallet cargo. An inspection system and an inspection method that may improve maintainability and reduce costs are also provided, especially an inspection system and an inspection method for an aviation pallet cargo. An inspection system and an inspection method that reduce the difficulty of loading and unloading objects are also provided, especially an inspection system and an inspection method for an aviation pallet cargo.

According to embodiments of the present disclosure, a dynamic-static combined scanning method is used in the inspection system and the inspection method. It is possible to splice out a larger combined scanning angle and ray emission range through the rotation or translation of the one or more ray sources relative to the carrying device, so as to produce more complete scanning data and better scanning effect. When the combined scanning angle meets CT reconstruction needs, it is possible to produce better CT scanning effect and better three-dimensional scanning image. The one or more ray sources move between different scanning positions relative to the carrying device (the number of movements is generally less than 10 times), so that the object passing rate and the imaging quality may be improved. The inspection system and the inspection method according to embodiments of the present disclosure are particularly suitable for scanning a large-sized object such as an aviation pallet cargo. Different from an existing design in which, for example, a slip ring is used, embodiments of the present disclosure may reduce the size and manufacturing cost of the inspection system and improve the stability of the inspection system. The inspection system and the inspection method according to embodiments of the present disclosure may also achieve a target spot densification through a local movement of the one or more ray sources, thereby improving the spatial resolution and recognition accuracy of a perspective image. Different from vertical CT scanning, the inspection system and the inspection method according to embodiments of the present disclosure may provide a scanning section with a small cross-sectional area, thereby improving the imaging quality. In addition, the X-rays may either not pass through or rarely pass through the pallet of the aviation pallet cargo, thereby reducing or eliminating the impact of the pallet on the scanning imaging.

Embodiments of the present disclosure have been described with reference to exemplary embodiments. However, it should be understood that embodiments of the present disclosure are not limited to the constructions and methods of the aforementioned embodiments. On the contrary, embodiments of the present disclosure are intended to cover modified examples and equivalent configurations. In addition, although various elements and method steps of the disclosed invention are shown in various exemplary combinations and constructions, other combinations including more or fewer elements or methods also fall within the scope of embodiments of the present disclosure.

What is claimed is:

1. An inspection system, comprising:

at least one ray source configured to emit X-rays, wherein each ray source comprises a separate housing configured to define a vacuum space and comprises a plurality of target spots enclosed within the housing;

a detector assembly configured to receive X-rays emitted from the at least one ray source and passing through an inspection region of the inspection system; and a conveying device configured to carry an object to be inspected, wherein the at least one ray source and the detector assembly are movable in a traveling direction relative to the conveying device, so that the object to be inspected enters the inspection region, and the at least one ray source is translatable among a plurality of scanning positions when viewed along a central axis of the inspection region, a translation distance of the at least one ray source between two adjacent scanning positions is greater than a spacing between adjacent target spots of each ray source, and the traveling direction is parallel to the central axis; and wherein the inspection system is configured such that: the at least one ray source and the detector assembly move in the traveling direction relative to the conveying device and the at least one ray source emits X-rays, when the at least one ray source is located at one of the plurality of scanning positions; and the at least one ray source translates to another one of the plurality of scanning positions, after the at least one ray source and the detector assembly move a predetermined distance in the traveling direction relative to the conveying device.

2. The inspection system of claim 1, wherein the at least one ray source is configured to translate between different scanning positions, so that a combined scanning angle of the at least one ray source is greater than 180 degrees.

3. The inspection system of claim 1, wherein the inspection system is configured such that: the at least one ray source and the detector assembly do not move in the traveling direction relative to the conveying device when the at least one ray source translates between different scanning positions.

4. The inspection system of claim 1, wherein the translation distance of each ray source between two adjacent scanning positions is less than a length of the ray source in the translation direction.

5. The inspection system of claim 1, wherein the detector assembly is arranged radially closer to the central axis than the at least one ray source.

6. The inspection system of claim 5, wherein target spots of the at least one ray source are located in a first plane.

7. The inspection system of claim 6, wherein detector crystals of the detector assembly are located in a second plane.

8. The inspection system of claim 7, wherein the first plane is parallel to the second plane, and a target spot of each ray source is configured to deflect a predetermined tilt angle toward the detector assembly along the central axis, so that the X-rays emitted by each ray source are not blocked by the detector assembly before passing through the inspection region.

9. The inspection system of claim 8, wherein the detector assembly comprises a plurality of detector arms, each detector arm is provided with a plurality of detector units, and each detector arm is configured to receive X-rays emitted by at least two ray sources;

wherein each detector unit comprises a detector crystal, and each detector crystal is arranged at an end of a corresponding detector unit close to the at least one ray source along the central axis; and wherein the plurality of detector arms are configured to extend completely around the central axis to form a detector ring.

10. The inspection system of claim 1, wherein the at least one ray source comprises a plurality of ray sources, and the plurality of ray sources are configured to translate between different scanning positions synchronously; and wherein the plurality of ray sources are spaced around the inspection region.

11. The inspection system of claim 1, wherein the detector assembly is configured to be translatable when viewed along the central axis of the inspection region; and wherein the at least one ray source and the detector assembly are configured to synchronously translate when viewed along the central axis of the inspection region.

12. The inspection system of claim 1, wherein each ray source is further configured to be movable between at least two target spot positions, a rotation angle of each ray source between two adjacent target spot positions is less than an angle of two adjacent target spots of the ray source relative to the central axis, or a movement distance of each ray source between two adjacent target spot positions is less than a spacing between two adjacent target spots of the ray source; and wherein a rotation angle of each ray source between two farthest target spot positions is less than the angle of two adjacent target spots of the ray source relative to the central axis, or a movement distance of each ray source between two farthest target spot positions is less than the spacing between two adjacent target spots of the ray source.

13. The inspection system of claim 1, wherein the at least one ray source is configured to be always located above the conveying device during a translation process;

wherein the central axis is parallel to a horizontal direction; and wherein a ray emission direction of the at least one ray source is not perpendicular to the central axis.

14. The inspection system of claim 1, wherein the inspection system is configured such that the at least one ray source does not emit X-rays when the at least one ray source translates between different scanning positions;

wherein the at least one ray source and the detector assembly move a predetermined distance in the traveling direction relative to the conveying device, so that the object to be inspected completely passes through the inspection region or the object to be inspected does not completely pass through the inspection region; and wherein the translation distance of the at least one ray source between two adjacent scanning positions is greater than a spacing between any two target spots of each ray source.

15. An inspection method, comprising the following steps:

(a) carrying an object to be inspected on a conveying device;

(b) positioning, when viewed along a central axis of an inspection region, at least one ray source at one of a plurality of scanning positions surrounding the inspection region, wherein each ray source comprises a separate housing configured to define a vacuum space and comprises a plurality of target spots enclosed within the housing;

(c) moving the at least one ray source and a detector assembly in a traveling direction relative to the conveying device, so that the object to be inspected enters the inspection region, while emitting X-rays from the at least one ray source so that the X-rays pass through the object to be inspected located in the inspection region and are received by the detector assembly, and a scanning process is completed until the at least one ray source and the detector assembly move a predetermined distance in the traveling direction relative to the conveying device; and (d) translating the at least one ray source to another one of the plurality of scanning positions, and repeating step (c) to complete the scanning process at each of the plurality of scanning positions, wherein a translation distance of the at least one ray source between two adjacent scanning positions is greater than a spacing between adjacent target spots of each ray source, and the traveling direction is parallel to the central axis.

16. The inspection method of claim 15, wherein steps (c) and (d) are repeated, so that a combined scanning angle of the at least one ray source is greater than 180 degrees.

17. The inspection method of claim 15, wherein the at least one ray source and the detector assembly are configured to stop moving in the traveling direction relative to the conveying device after each time the object to be inspected completely passes through the inspection region, and in two adjacent repetitions of step (c), the ray source and the detector assembly are configured to move in opposite directions relative to the conveying device; and wherein the translation distance of each ray source between two adjacent scanning positions is less than a length of the ray source in the translation direction.

18. The inspection method of claim 15, further comprising: after completing a scanning process at one of the plurality of scanning positions in step (c), moving the at least one ray source to one of a plurality of target spot positions and repeating step (c), wherein the plurality of target spot positions comprise a current scanning position, wherein a rotation angle of each ray source between two adjacent target spot positions is less than an angle of two adjacent target spots of the ray source relative to the central axis, or a movement distance of each ray source between two adjacent target spot positions is less than a spacing between two adjacent target spots of the ray source; and wherein a rotation angle of each ray source between two farthest target spot positions is less than the angle of two adjacent target spots of the ray source relative to the central axis, or a movement distance of each ray source between two farthest target spot positions is less than the spacing between two adjacent target spots of the ray source.

19. The inspection method of claim 15, wherein the at least one ray source is configured to be always located above the conveying device during a translation process of the at least one ray source;

wherein the central axis is parallel to a horizontal direction; and wherein a ray emission direction of the at least one ray source is not perpendicular to the central axis.

20. The inspection method of claim 15, wherein the at least one ray source does not emit X-rays when the at least one ray source translates between different scanning positions;

wherein the at least one ray source and the detector assembly move a predetermined distance in the traveling direction relative to the conveying device, so that the object to be inspected completely passes through the inspection region or the object to be inspected does not completely pass through the inspection region; and wherein the translation distance of the at least one ray source between two adjacent scanning positions is greater than a spacing between any two target spots of each ray source.

* * * * *